United States Patent
Horikomi

(10) Patent No.: US 6,970,603 B2
(45) Date of Patent: Nov. 29, 2005

(54) DATA ENCODING APPARATUS AND METHOD OF SAME AND CAMERA SYSTEM

(75) Inventor: Hitomi Horikomi, Kanagawa (JP)

(73) Assignee: Sony Corporation, Tokyo (JP)

( * ) Notice: Subject to any disclaimer, the term of this patent is extended or adjusted under 35 U.S.C. 154(b) by 653 days.

(21) Appl. No.: 10/075,557

(22) Filed: Feb. 13, 2002

(65) Prior Publication Data

US 2002/0122556 A1 Sep. 5, 2002

(30) Foreign Application Priority Data

Feb. 15, 2001 (JP) .............................. 2001-038348

(51) Int. Cl.$^7$ .............................................. G06K 9/36
(52) U.S. Cl. ..................................... 382/232; 382/239
(58) Field of Search ................................ 382/232, 239; 375/240, 240.24

(56) References Cited

U.S. PATENT DOCUMENTS 5,063,608 A * 11/1991 Siegel ......................... 382/239
RE36,380 E 11/1999 Juri ............................ 348/405

FOREIGN PATENT DOCUMENTS

EP 0 267 578 5/1988 .......... H04N 7/133
EP 0 426 260 5/1991

OTHER PUBLICATIONS

K. Sayood: "Introduction to Data Compression" 1996, Morgan Kaufmann Publishers, San Francisco, California XP002245494 pp. 342-348, chapter 12.6.

* cited by examiner

Primary Examiner—Joseph Mancus
Assistant Examiner—Duy M Dang
(74) Attorney, Agent, or Firm—Frommer Lawrence & Haug LLP; William S. Frommer

(57) ABSTRACT

A data encoding apparatus, and method and a camera system using the same, improved in speed of processing. The predetermined write addresses in accordance with an input sequence of data are generated corresponding to the data and stored at corresponding addresses of a storage unit, an address the latest in a read sequence from the storage unit among the write addresses of the non-zero data is detected at an EOB (encoding of data block) detection unit, read addresses are sequentially generated, the data is read from the addresses of the storage unit and output to an encoding unit, when the read address and the detection address of the EOB detection unit do not coincide, the data is sequentially encoded at the encoding unit, when they coincide, the data of this address is encoded, a code EOB is generated, and the encoding is terminated.

14 Claims, 16 Drawing Sheets

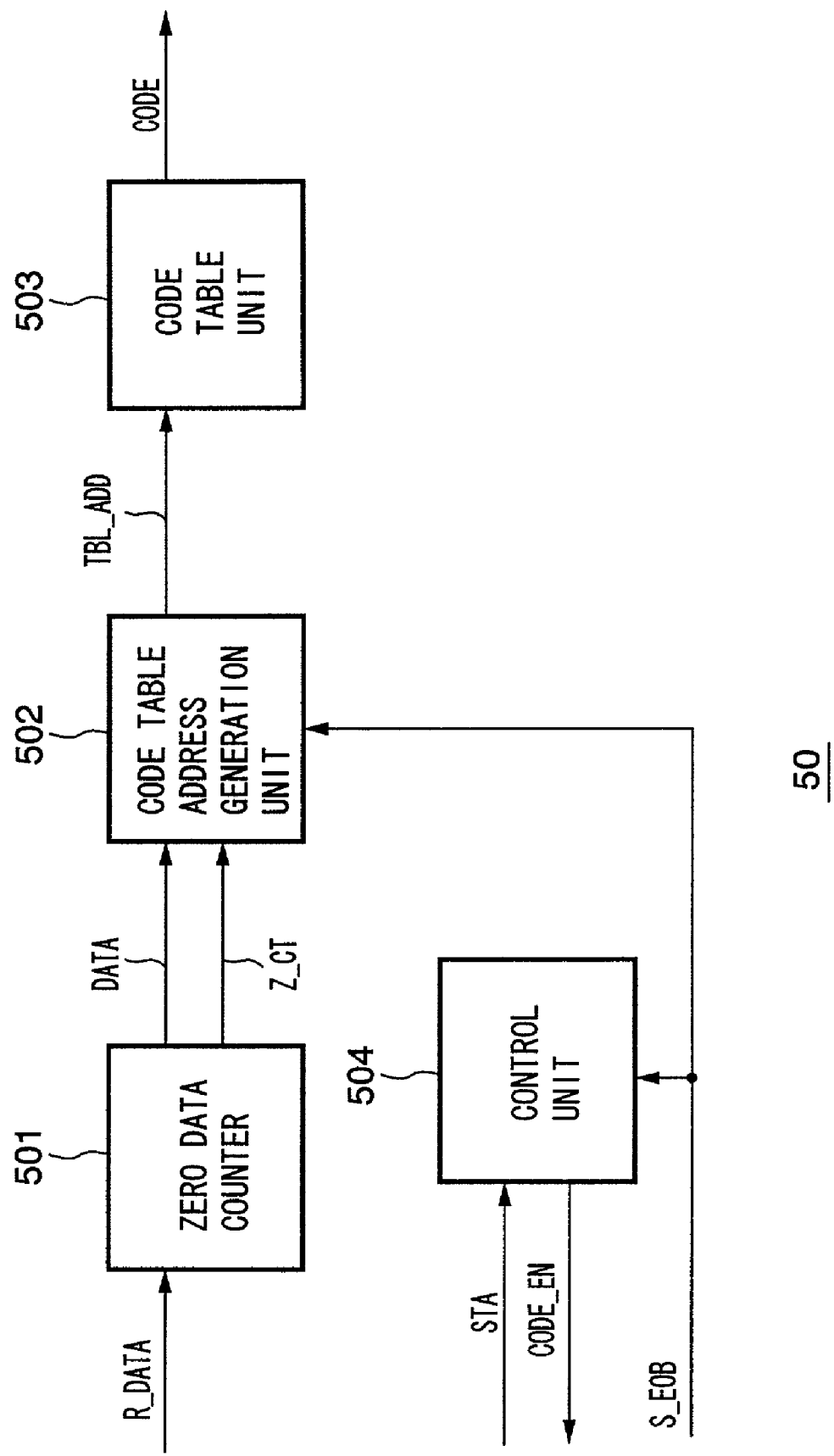

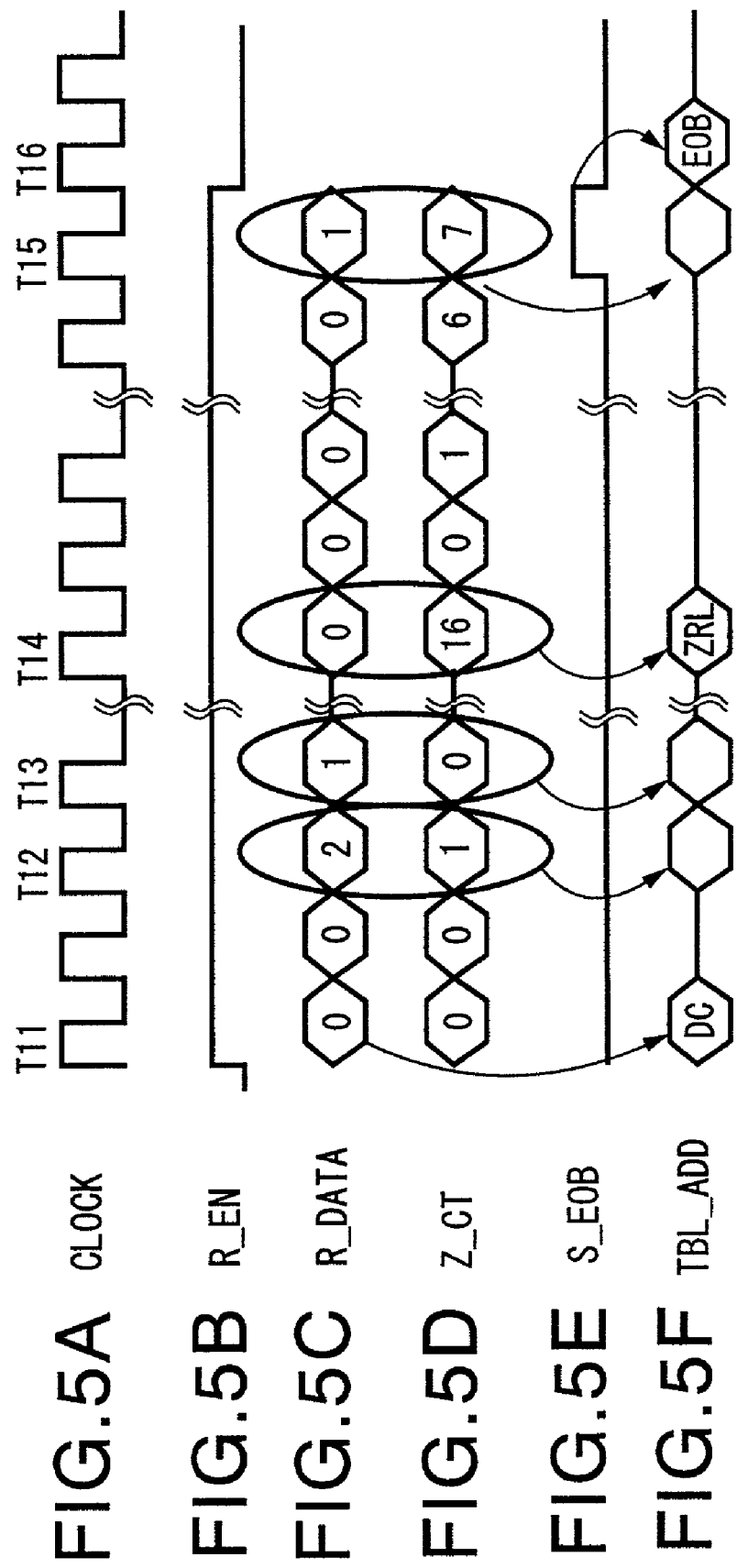

FIG.6A T_K

FIG.6B R_DATA

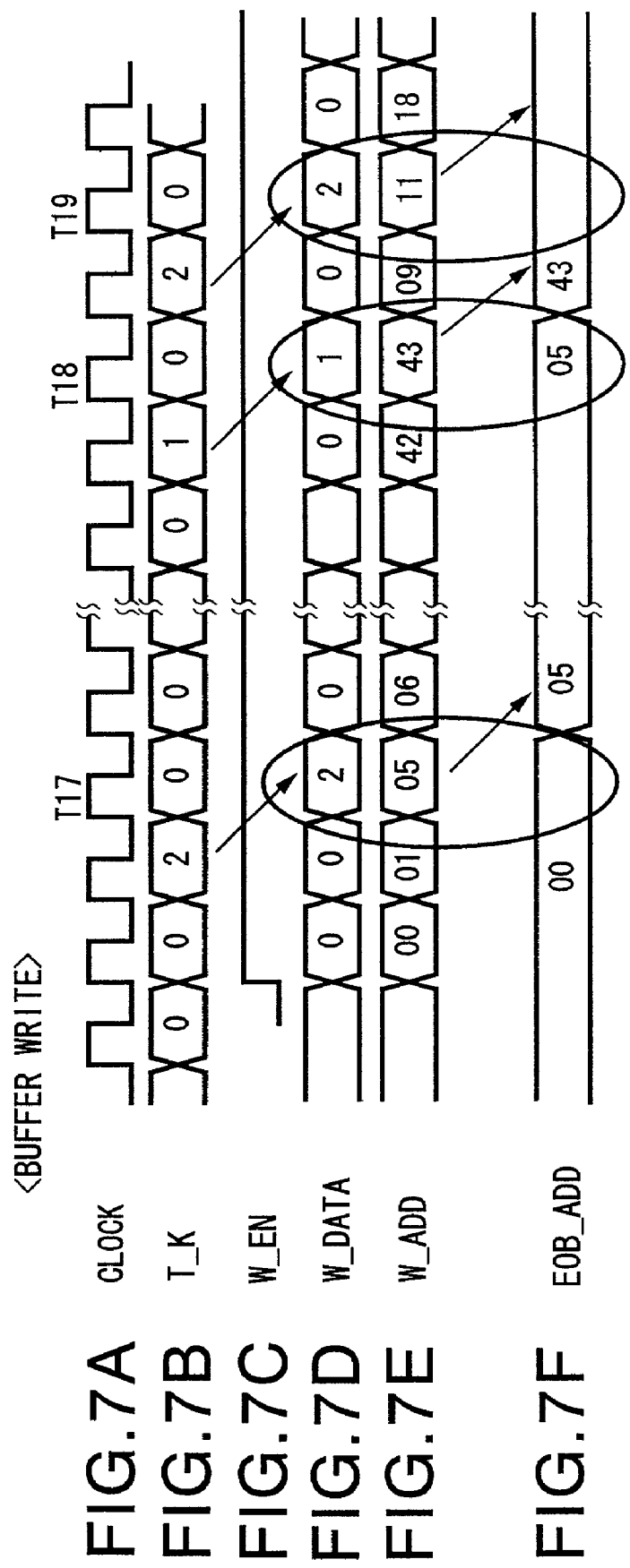

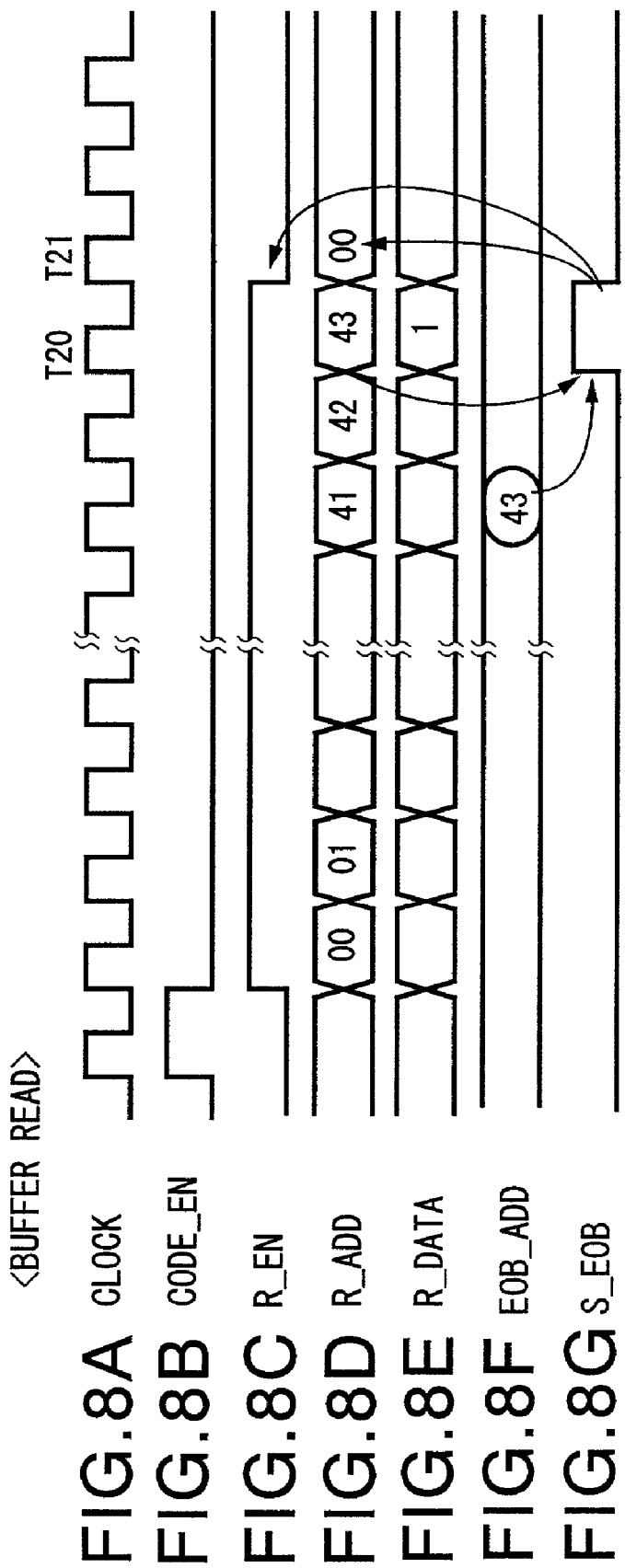

FIG.15

| 0 | 0 | 2 | 1 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 0 | 0 | 0 | 0 | 0 | 0 |
| 0 | 0 | 0 | 0 | 0 | 0 | 0 | 0 |

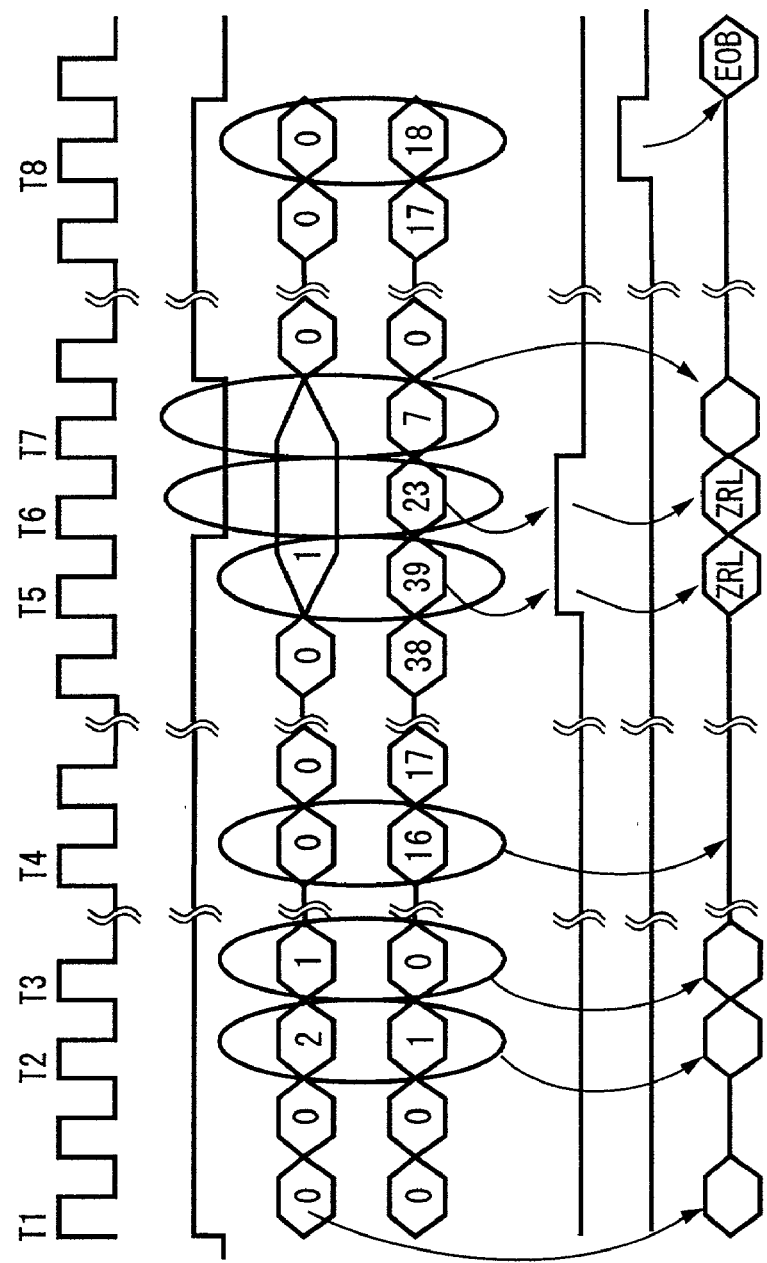

DATA ENCODING APPARATUS AND METHOD OF SAME AND CAMERA SYSTEM

BACKGROUND OF THE INVENTION

1. Field of the Invention

The present invention relates to a data encoding apparatus for encoding data for every data block of a predetermined number of pixels of data and a method of the same and to a camera system for compressing and encoding generated image data for every data block of the predetermined number of bits of data. More particularly, the present invention relates to a data encoding apparatus for JPEG encoding image data for every block of for example 8×8 pixels and a method of the same and to a camera system.

2. Description of the Related Art

In a natural image, adjoining pixel values frequently have correlation. When the spatial fluctuation (spatial frequency) of the pixel values when seen in a certain small region becomes small (low), and the image data in a real domain is transformed to data in a spatial frequency domain by a quadrature transform, the data tends to lean to the low frequency side. For this reason, when encoding the data in the spatial frequency domain, an average code length of the entire data can be. shortened by making the code length allocated to the data on the high frequency side shorter than that to the data on the low frequency side, so the amount of data can be compressed.

For example, in a discrete cosine transform (DCT) type encoding system of a standard international system for compressing and encoding still image data, that is, the color still image encoding system of the Joint Photographic Experts Group (JPEG), the input image data is divided into data blocks each consisting of 8×8 pixels, and each data block is subjected to one quadrature transform, DCT. By this, the 64 bits of image data of one data block are transformed to 64 DCT coefficients. These DCT coefficients are quantized by a quantization step determined for every coefficient, then one DC component and the other 63 AC components are encoded to Huffman codes by methods different from each other.

When the DCT coefficients are DC components, the data of the difference between continuous blocks are Huffman encoded. This is because the DC components between adjoining data blocks in a natural image have correlation in many cases, and the dispersion of differential values becomes smaller.

Also, when the DCT coefficients are AC components, the data string of the DCT coefficients rearranged to a sequence in accordance with the magnitude of the spatial frequency are encoded to a Huffman code in accordance with the combination of the value of non-zero coefficients and the number of the zero coefficients continuing before that. This is done to improve the compression efficiency by utilizing the property that quantized DCT transformed coefficients easily become zero at the high frequency side.

Note, there are two special cases in the encoding of AC components. One is a case where 16 or more AC components of zero coefficients continue in the above data string. In this case, one code referred to as a "zero run length" (ZRL) is generated for the 16 continuous zero coefficients. The other one is a case where the last AC component of the data string is the zero coefficient. In this case, only one code referred to as an "end of data block" (EOB) is generated for the zero coefficients continuing up to the last bit of the data string irrespective of the number thereof.

In both cases, one code is given to a plurality of zero coefficients together, so the compression efficiency is raised.

Here, a related art JPEG encoding apparatus will be concretely explained by referring to the drawings.

FIG. 10 is a schematic view of the configuration of a related art JPEG encoding apparatus. The JPEG encoding apparatus shown in FIG. 10 has a DCT/quantization unit 1, DCT buffer control unit 2, DCT buffer 3, and Huffman encoding unit 4.

The DCT/quantization unit 1 transforms image data D_IN input for every 8×8 pixel data block by DCT and quantizes 64 DCT coefficients obtained as a result of this by the quantization step determined for every coefficient. Then, an enable signal DCT_EN is changed to an active state and output of header data of a 8×8 pixel data block is notified, then 64 quantized DCT coefficients DCT_K are sequentially output to the DCT buffer control unit 2.

The DCT buffer control unit 2 sets the DCT buffer 3 in a write enable state by an enable signal W_EN when the enable signal DCT_EN of the DCT/quantization unit 1 changes to the active state, sequentially generates write addresses W_ADD of a zigzag (meander) scan sequence corresponding to the DCT coefficients DCT_K of the DCT/quantization unit 1, and sequentially writes the DCT coefficients DCT_K at these generated addresses.

Also, when an enable signal HUFF_EN of the Huffman encoding unit 4 changes to the active state, it sets the DCT buffer 3 in a read enable state by an enable signal R_EN, sequentially generates read addresses R_ADD and reads out DCT coefficients R_DATA from the DCT buffer 3, and sequentially outputs them to the Huffman encoding unit 4.

A more detailed explanation will be made of this DCT buffer control unit 2 with referring to FIG. 11.

FIG. 11 is a schematic view of the configuration for explaining this DCT buffer control unit 2. The DCT buffer control unit 2 shown in FIG. 11 has a latch circuit 21, zigzag (meander) address generation unit 22, and read address generation unit 23.

The latch circuit 21 is a circuit for holding the DCT coefficients DCT_K from the DCT/quantization unit 1 synchronous with a not illustrated clock signal and outputting them as write data W_DATA to the DCT buffer 2. The data W_DATA and the write address W_ADD are synchronously supplied to the DCT buffer 2 by this.

The zigzag address generation unit 22 monitors the state of the enable signal DCT_EN of the DCT/quantization unit 1, changes the write enable signal W_EN to the active state synchronous with detection of this active state, and sets the DCT buffer 3 in the write enable state. Further, it sequentially generates write addresses W_ADD in the zigzag scan sequence corresponding to the DCT coefficients DCT_K sequentially input from the. DCT/quantization unit 1 and sequentially writes the DCT coefficients W_DATA at these generated addresses. After writing 64 DCT coefficients into the DCT buffer 3, it returns the enable signal W_EN to a non-active state and returns to the monitoring state of the enable signal DCT_EN again.

The read address generation unit 23 monitors the state of the enable signal HUFF_EN of the Huffman encoding unit 4, changes the read enable signal R_EN to the active state synchronous with the detection of this active state, and sets the DCT buffer 3 in the read enable state. Further, it sequentially generates read addresses R_ADD, reads out the DCT coefficients from the DCT buffer 3, and sequentially outputs these read DCT coefficients R_DATA to the Huffman encoding unit 4.

FIGS. 12A and 12B are views of an example of a sequence of generating the DCT coefficients at the DCT/quantization unit 1 and the sequence of reading the DCT coefficients written in the DCT buffer 2 according to the sequence of the zigzag (meander) scan.

In FIG. 12A, the numerals corresponding to the DCT coefficients of the data blocks expressed by two dimensions of 8×8 indicate the sequence of the generation of the DCT coefficients. The spatial frequency of these DCT coefficients becomes higher from the left to right and from the upper stage to lower stage. Also, the arrows indicated by the dotted lines in this illustration show the sequence of the zigzag scan. The write addresses W_ADD are generated at the zigzag scan address generation unit 22 so that the data is read from the DCT buffer 2 in accordance with this sequence.

As seen from this illustration, the sequence of the zigzag scan is set so that the spatial frequencies in a horizontal direction and a vertical direction equally become higher in accordance with this sequence.

Also, the numerals of the DCT coefficients in FIG. 12B correspond to the numerals in FIG. 12A. The arrows indicated by the dotted lines indicate the sequence of the reading of the DCT coefficients written in the DCT buffer 2. The DCT coefficients are sequentially read from the DCT buffer 2 in the sequence from left to right and from the upper stage to lower stage of the data blocks expressed by the two dimensions shown in the figure. Also, this data block indicates an address space of the DCT buffer 2. The address value becomes larger from for example the left to right and from the upper stage to the lower stage. Accordingly, in the read address generation unit 23, it is not necessary to generate a complex address as in the zigzag scan address generation unit 22. Addresses simply increasing by predetermined steps from for example the first to 64-th DCT coefficients are generated.

The above explanation was made for the DCT buffer control unit 2 of FIG. 10.

The DCT buffer 3 of FIG. 10 stores the DCT coefficients W_DATA sequentially generated in the DCT/quantization unit 1 in storage areas designated by the write addresses W_ADD when set in the write enable state by the enable signal W_EN from the DCT buffer control unit 2.

Also, when set in the read enable state by the enable signal R_EN from the DCT buffer control unit 2, the DCT buffer 3 reads the DCT coefficients R_DATA from the storage area designated by the read address R_ADD and outputs this to the Huffman encoding unit 4.

The Huffman encoding unit 4 sets the enable signal HUFF_EN in the active state when performing the encoding, Huffman encodes the DCT coefficients sequentially read from the DCT buffer 3 by the DCT buffer control unit 2, and outputs a Huffman code H_CODE. Also, when a signal S_EOB for indicating an end of encoding of the data block is input from the EOB detection unit 5, it outputs the code EOB.

This Huffman encoding unit 4 will be explained in further detail with referring to FIG. 13.

FIG. 13 is a schematic view of the configuration for explaining this Huffman encoding unit 4. The Huffman encoding unit 4 shown in FIG. 13 has a zero data counter 41, Huffman code table address generation unit 42, Huffman code table 43, ZRL judgment unit 44, and data control unit 45.

The zero data counter 41 is a counter for counting the number of continuous zero coefficients of the AC components in the data string of the DCT coefficients R_DATA read from the DCT buffer 3. It initializes this count to zero at a point of time when the encoding of one block is started and increments the count by one whenever zero coefficients of AC components are input to the DCT coefficients R_DATA. Then, when the non-zero coefficients are input to the DCT coefficients R_DATA, it outputs the non-zero coefficients DATA and a count Z_CT to the Huffman code table address generation unit 42 and the ZRL judgment unit 44 and initializes the count to zero after that. Also, when a signal S_ZRL for notifying the generation of the code ZRL is input, it decrements a value "16" from this count of zero coefficients.

The Huffman code table address generation unit 42 generates an address TBL_ADD of the Huffman code table 43 in accordance with the combination of the non-zero coefficients DATA and the count Z_CT output from the zero data counter 41 and outputs them to the Huffman code table 43.

Also, it generates the address TBL_ADD corresponding to the code ZRL when a signal S_ZRL indicating the generation of the code ZRL is input, while generates the address TBL_ADD of the Huffman code table 43 corresponding to the code EOB when a signal S_EOB indicating the end of encoding of the data block is input.

The Huffman code table 43 extracts the Huffman code corresponding to the table address TBL_ADD from a predetermined data table and outputs this.

The ZRL judgment unit 44 generates the signal S_ZRL indicating the generation of the code ZRL when the count of the zero coefficients is "16" or more and then the non-zero coefficients are input and outputs them to the zero data counter 41, the Huffman code table address generation unit 42, and the data control unit 45.

The data control unit 45 sets the enable signal HUFF_EN in the active state upon receipt of an activation signal STA and starts reading the DCT coefficients from the DCT buffer 3.

Also, when the signal S_ZRL for indicating the generation of the code ZRL is input from the ZRL judgment unit 44, it temporarily sets the enable signal HUFF_EN in the non-active state, suspends the reading of the DCT coefficients from the DCT buffer 3, and returns the enable signal HUFF_EN to the active state again after the generation of the code ZRL to re-start the encoding.

When the reading of one data block's worth of the DCT coefficients is terminated or when the signal S_EOB for indicating the end of the encoding of the data block is input, it returns the enable signal HUFF_EN to the non-active state and terminates the Huffman encoding.

The above explanation was made for the Huffman encoding unit 4 of FIG. 10.

The EOB judgment unit 5 of FIG. 10 detects whether or not the value of the DCT coefficients read out at the end of one data block are zero based on the DCT coefficients R_DATA read from the DCT buffer 3 and the address R_ADD thereof. When this value is zero, it generates a signal S_EOB indicating the end of encoding of the data block and outputs this to the Huffman encoding unit 4.

Next, an explanation will be made of the operation of the JPEG encoding apparatus of FIG. 10 having the above configuration.

FIGS. 14A to 14F show timing charts for explaining an operation for rearrangement of the DCT coefficients in the JPEG encoding apparatus shown in FIG. 10 to a zigzag scan sequence. Among them, FIG. 14A to FIG. 14F show timing charts of the operation when the DCT coefficients are written into the DCT buffer 3, while the remaining FIG. 14G to FIG.

14K show timing charts of an operation when the DCT coefficients are read from the DCT buffer 3.

When the enable signal DCT EN (FIG. 14B) of the DCT/quantization unit 1 is set in the active state synchronous to the clock signal (FIG. 14A), the write enable signal W_EN (FIG. 14D) is set in the active state in the zigzag address generation unit 22 detecting this active state and, at the same time, the write address W_ADD (FIG. 14E) is generated according to the zigzag sequence. Also, the DCT coefficients W_DATA (FIG. 14F) obtained by latching of the DCT coefficients DCT_K (FIG. 14C) of the DCT/quantization unit 1 at the latch circuit 21 and the output of the write address W_ADD generated at the zigzag address generation unit 22 are output to the DCT buffer 3 synchronous with the clock signal. The write enable signal W_EN is returned to the non-active state again after 64 DCT coefficients are written into the DCT buffer 3.

When the enable signal HUFF_EN (FIG. 14H) of the Huffman encoding unit 4 is set in the active state synchronous with the clock signal (FIG. 14G), the enable signal R_EN (FIG. 14I) is set in the active state in the read address generation unit 23 detecting this active state and the read addresses R_ADD (FIG. 14J) are sequentially generated. By this, the DCT coefficients R_DATA (FIG. 14K) stored in the DCT buffer 3 are sequentially read and input to the Huffman encoding unit 4. The read enable signal R_EN is returned to the non-active state again after 64 DCT coefficients are read from the DCT buffer 3.

FIG. 15 is a view of an example of the DCT coefficients of 8×8 pixel data block read from the DCT buffer 3 and input to the Huffman encoding unit 4, while FIGS. 16A to 16G are timing charts for explaining the operation of the Huffman encoding unit 4 when the DCT coefficients shown in FIG. 15 are input. An explanation will be made of operations at the time T1 to time T8 in this timing chart.

Time T1: The read enable signal R_EN (FIG. 16B) changes to the active state synchronous with the clock signal (FIG. 16A), then the DCT coefficients R_DATA (FIG. 16C) are input to the Huffman encoding unit 4. The DCT coefficients R_DATA input to the start of the data block are DC components. The processing is different from that for the AC components subsequently input. For the DC components, the addresses TBL_ADD of the Huffman code table for the DC components are generated based on the differential value relative to the previously input DC components of the 8×8 pixel data block. A Huffman code H_CODE in accordance with this is output from the Huffman code table 43.

Time T2: Non-zero data (value "2") are input as the DCT coefficients R_DATA. An addresses TBL_ADD (FIG. 16G) in accordance with the combination of the value "2" and a value "1" of the count Z_CT (FIG. 16D) of the zero coefficients continuously input before the value "2" are generated at the Huffman code table address generation unit 42. The Huffman code H_CODE in accordance with this is output from the Huffman code table 43.

Time T3: The non-zero data (value "1") are input as the DCT coefficients R_DATA. An address TBL_ADD in accordance with the combination of this value "1" and a value "0" of the count Z_CT of the zero coefficients continuously input before this value "1" are generated. The Huffman code H_CDE in accordance with this is output.

Time T4: The count Z_CT of the continuously input zero coefficients reaches the value "16", but in this stage, it cannot be decided which of the code ZRL or the code EOB is to be generated, so the encoding is not carried out. Namely, there are two such cases: a case where zeros appear up to the last DCT coefficient and one code EOB is generated and a case where one or more codes ZRL are generated by non-zero DCT coefficients present before the last DCT coefficient. It cannot be decided at the time T4 which case is exhibited, so the address TBL ADD is not generated.

Time T5: Non-zero data (value "1") is input as the DCT coefficient R_DATA. Also, at this time, the count Z_CT of the continuously input zero coefficients is a value more than 16, i.e., "39", so the signal S_ZRL (FIG. 16E) for indicating the generation of the code ZRL is generated at the ZRL judgment unit 44. Due to this, an address TBL_ADD corresponding to the code ZRL is input to the Huffman code table 43 and the code ZRL is output, while the value "16" is subtracted from the count Z_CT of the zero coefficients. Further, the enable signal HUFF_EN is set in the non-active state, whereupon the reading of the DCT coefficients from the DCT buffer 3 is temporarily suspended.

Time T6: Since the reading of the DCT coefficients is suspended, the DCT coefficients R_DATA keep the non-zero data (value "1") the same as that at the time T5 as it is, and the count Z_CT of the zero coefficients is a value "23", so the signal S_ZRL for indicating the generation of the code ZRL is continuously generated. Due to this, the address TBL_ADD corresponding to the code ZRL is input to the Huffman code table 43 and the code ZRL is output, while the value "16" is further subtracted from the count Z_CT of the zero coefficients. Also, the enable signal HUFF_EN is in the non-active state as it is, so the reading of the DCT coefficients from the DCT buffer 3 is continuously suspended.

Time T7: Since the reading of the DCT coefficients is suspended, the DCT coefficients R_DATA are non-zero (value "1") data the same as that at the time T6, but the count Z_CT of the zero coefficients becomes a value "7" and becomes smaller than the value "16", so the code ZRL is not generated. In place of this, an addresses TBL_ADD in accordance with the combination of the value "1" of the DCT coefficients R_DATA and the value "7" of the count Z_CT of the zero coefficients are generated. A Huffman code H_CODE in accordance with this is generated.

Time T8: Since the value of the last DCT coefficient becomes zero, the signal S_EOB indicating the end of encoding of the data block is output from the EOB judgment unit 5. An address TBL_ADD corresponding to the code EOB is generated at the Huffman code table address generation unit 42 receiving this and input to the Huffman code table unit 43. Also, the enable signal HUFF_EN is returned to the non-active state at the data control unit 45, and the enable signal R_EN is returned to the non-active state at the read address generation unit 23 in accordance with this, so the read operation of the data from the DCT buffer 3 is terminated.

In this way, in the related art JPEG encoding apparatus, even if all AC components are zero, a possibility of the code ZRL remains until it is confirmed that the value of the last data of the zigzag scan is zero, so the code EOB cannot be generated. Namely, even in a case where only the code EOB is generated as a result, all of one data block's worth of 64 DCT coefficients must be confirmed, so there is the disadvantage in that the processing time relating to the encoding cannot be shortened.

Also, when 16 or more DCT coefficients continuously become zero, one code of the code ZRL or code EOB should be generated, but it cannot be decided which code is to be generated until the non-zero DCT coefficients are input or zeros continue up to the end, so the code ZRL is not generated. For this reason, when the non-zero DCT coefficients are input, it is necessary to once suspend the input of the DCT coefficients from the DCT buffer 3 and generate the code ZRL. Namely, there is the disadvantage in that a delay time is generated in the reading of the DCT coefficients whenever the code ZRL is generated.

SUMMARY OF THE INVENTION

A first object of the present invention is to provide a data encoding apparatus capable of improving a speed of the encoding.

A second object of the present invention is to provide a data encoding method capable of improving a speed of the encoding.

A third object of the present invention is to provide a camera system capable of compressing and encoding generated image data at a higher speed.

To attain the above first object, according to a first aspect of the present invention, there is provided a data encoding apparatus for encoding data for every data block of a predetermined number of pixels of data, comprising a data string rearranging means for outputting data of sequentially input data blocks in a predetermined output sequence corresponding to an input sequence, a data block end data detecting means for detecting input data not coinciding with reference data and latest in the output sequence from among the input data of the data string rearranging means as block end data, a block end judging means for judging whether or not the output data of the data string rearranging means is the block end data, and an encoding means for sequentially generating codes in accordance with the output data of the data string rearranging means, generating a first code after the generation of the codes in accordance with the output data when it is judged at the block end judging means that the output data is the block end data, and terminating the encoding of the data block containing the output data.

Preferably, the encoding means counts the number of the zero data continuously output from the data string rearranging means, generates a code in accordance with the count of continuous zero data and the value of the data which is not the zero data output after the continuous zero data, and generates a second code and subtracts the predetermined value from the count when the count reaches a predetermined value.

Preferably, the data string rearranging means comprises a storing means for storing the input data at a designated address upon receipt of a data write request and reading the data stored at the designated address upon receipt of a data read request, a writing means for outputting the data write request to the storing means, generating predetermined write addresses in accordance with the input sequence of the input data corresponding to the input data, and storing the input data at corresponding write addresses of the storing means, and a reading means for outputting the data read request to the storing means, sequentially generating predetermined read addresses, and sequentially reading the data stored at the read addresses of the storing means, and wherein the block end data detecting means detects the address read latest in the reading means among the write addresses of the input data not coinciding with the zero data as the block end address, and wherein the block end judging means judges that the output data corresponding to the read address is the block end data when the read address and the block end address coincide.

According to the data encoding apparatus of the present invention, the data rearranging means outputs the data of sequentially input data blocks in the predetermined output sequence corresponding to the input sequence. The block end data detecting means detects the input data not coinciding with the reference data and latest in the output sequence from among the input data of the data string rearranging means as the block end data. The block end judging means judges whether or not the output data of the data string rearranging means is the block end data. The encoding means sequentially generates codes in accordance with the output data of the data string rearranging means. When it is judged at the block end judging means that the output data is the block end data, it generates the first code after the generation of the code in accordance with the output data and terminates the encoding of the data block containing the output data.

Also, the encoding means counts the number of the zero data continuously output from the data string rearranging means and generates a code in accordance with the count of continuous zero data and the value of the data which is not zero data output after the continuous zero data. When this count reaches a predetermined value, a second code is generated, and the predetermined value is subtracted from the count.

Preferably, the writing means of the data string rearranging means outputs the data write request to the storing means, generates predetermined write addresses in accordance with the input sequence of the input data corresponding to the input data, and stores the input data at corresponding write addresses of the storing means. The reading means outputs the data read request to the storing means, sequentially generates predetermined read addresses, and sequentially reads the data stored at the read addresses of the storing means. The block end data detecting means detects the address read latest at the reading means among the write addresses of the input data not coinciding with the zero data as the block end address. When the read address and the block end address coincide, the block end judging means judges that the output data corresponding to the read address is the block end data.

To achieve the second object, according to a second aspect of the present invention, there is provided a data encoding method for encoding data for every data block of a predetermined number of pixels of data, including a block end data detecting step for detecting data not coinciding with reference data and latest in a predetermined output sequence corresponding to the input sequence of the input data from among the data of sequentially input data blocks as the block end data and an encoding step for outputting the input data in the output sequence, sequentially generating codes in accordance with the output data when the output data is not the block end data, generating a first code after the generation of a code in accordance with the output data when the output data is the block end data, and terminating the encoding of the data block containing the output data.

Preferably, the encoding step, the processing is carried out to count the number of continuously output zero data, generate a code in accordance with the count of the continuous zero data and the value of the data which is not zero data output after the continuous zero data, and generate a second code and subtracts the predetermined value from the count when the count reaches a predetermined value.

Preferably, the block end data detecting step includes a step of generating predetermined write addresses in accordance with the input sequence of the input data corresponding to the input data, a step of detecting the address read latest in the output sequence among the write addresses of the input data not coinciding with the zero data as the block end address, and a step of storing the input data at the corresponding write addresses of the storing means, and wherein the encoding step includes a step of sequentially generating predetermined read addresses, a step of sequentially reading the data stored at the read addresses of the storing means, and a step of sequentially generating codes in accordance with the output data when the read address and the block end address do not coincide, while generating the first code after the generation of the code in accordance with the output data when they coincide, and terminating the encoding of the data block containing the output data.

According to the data encoding method of the present invention, the block end data detecting step detects from among the data of sequentially input data blocks, data not coinciding with the reference data and latest in the predetermined output sequence corresponding to the input sequence of the input data as the block end data. The encoding step outputs the input data in the output sequence, sequentially generates codes in accordance with the output data when the output data is not the block end data, and generates a first code after the generation of a code in accordance with the output data when the output data is the block end data, and terminates the encoding of the data block containing the output data.

Also, the encoding step counts the number of continuously output zero data, generates a code in accordance with the count of continuous zero data and the value of the data which is not the zero data output after the continuous zero data, and generates the second code and subtracts the predetermined value from the count when the count reaches a predetermined value.

Preferably, the block end data detecting step generates predetermined write addresses in accordance with the input sequence of the input data corresponding to the input data. Also, it detects, from among the write addresses of the input data not coinciding with the zero data, the address read latest in the output sequence as the block end address. Also, it stores the input data at a corresponding write address of the storing means.

The encoding step sequentially generates the predetermined read addresses and sequentially reads the data stored at the read addresses of the storing means. When the read address and the block end address do not coincide, it sequentially generates codes in accordance with the output data, while when they do coincide, generates the first code after the generation of a code in accordance with the output data and terminates the encoding of the data block containing the output data.

To achieve the third object, according to a third aspect of the present invention, there is provided a camera system for compressing and encoding generated image data for every data block of a predetermined number of pixels of data, comprising an image pickup means for picking up an desired image and generating image data, a transforming means for transforming the generated image data based on a predetermined quadrature transform for every data block, a data string rearranging means for sequentially receiving as input the orthogonally transformed image data for every data block and outputting the input image data in a predetermined output sequence corresponding to the sequence of input of the input image data, a block end data detecting means for detecting input image data not coinciding with predetermined zero data and latest in the output sequence from among the input image data of the data string rearranging means as block end data, a block end judging means for judging whether or not the output image data of the data string rearranging means is the block end data, an encoding means for sequentially generating codes in accordance with the output image data of the data string rearranging means, generating a first code after the generation of the code in accordance with the output image data when it is judged at the block end judging means that the output image data is the block end data, and terminating the encoding of the data block containing the output image data, and a processing means for performing predetermined processing with respect to the image data encoded at the encoding means.

Preferably, the processing means performs at least one processing of recording, reproduction and display, or transmission with respect to the encoded image data.

BRIEF DESCRIPTION OF THE DRAWINGS

These and other objects and features of the present invention will become more clearer from the following description of the preferred embodiments with reference to the accompanying drawings, wherein:

FIG. 4 is a view of the configuration of an encoding unit of the data encoding apparatus shown in FIG. 1;

FIGS. 5A to 5F are timing charts for illustrating the operation of the encoding unit shown in FIG. 4;

FIGS. 6A and 6B are views showing an example of transformed data of an 8×8 pixel data block generated at a transform unit and data obtained by rearrangement of this transformed data to a zigzag manner;

FIGS. 7A to 7F are timing charts for illustrating a write operation of the transformed data into a storage unit in a case where the transformed data shown in FIGS. 6A and 6B is input to the data encoding apparatus;

FIGS. 8A to 8G are timing charts for explaining a read operation of the transformed data from the storage unit in a case where the transformed data shown in FIGS. 6A and 6B is input to the data encoding apparatus;

FIG. 15 is a view showing an example of the DCT coefficients of an 8×8 pixel data block input to the Huffman encoding unit; and FIGS. 16A to 16G are timing charts for explaining the operation of the Huffman encoding unit.

DESCRIPTION OF THE PREFERRED EMBODIMENTS

<First Embodiment>

An explanation will be made of a first embodiment according to the present invention by referring to FIG. 1 to FIG. 8.

Figure 1:
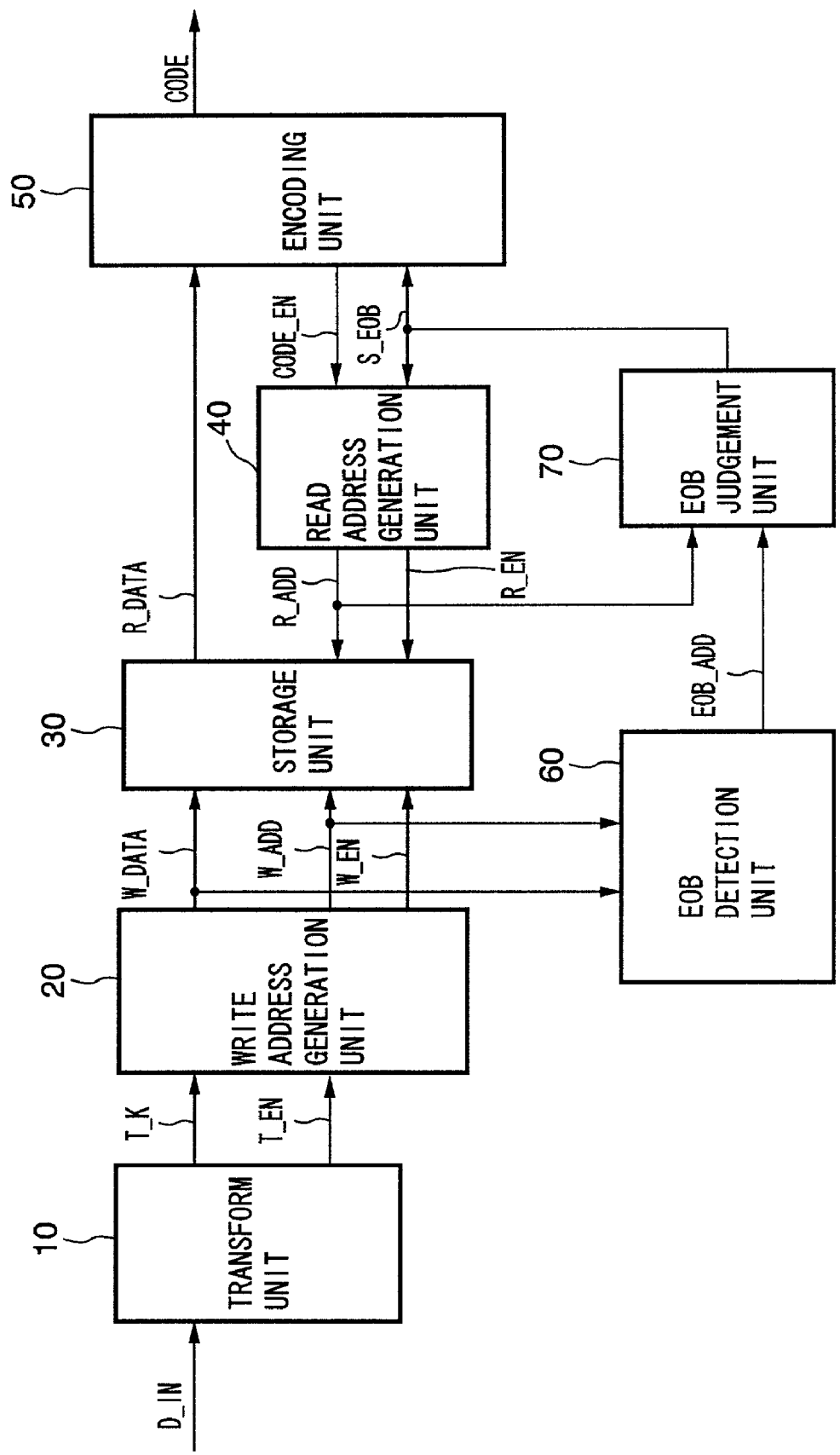
FIG. 1 is a schematic view of the configuration for illustrating a data encoding apparatus of a first embodiment according to the present invention.

FIG. 1 is a view of the configuration of a data encoding apparatus of the first embodiment according to the present invention. The data encoding apparatus shown in FIG. 1 has a transform unit 10, write address generation unit 20, storage unit 30, read address generation unit 40, encoding unit 50, EOB (encoding of data block) detection unit 60, and EOB (encoding of data block) judgment unit 70.

Note that, the circuit block including the write address generation unit 20, storage unit 30, and read address generation unit 40 is an embodiment of the data string rearranging means of the present invention.

The encoding unit 50 is an embodiment of the encoding means of the present invention.

The EOB detection unit 60 is an embodiment of the block end data detecting means of the present invention.

The EOB judgment unit 70 is an embodiment of the block end judging means of the present invention.

First, an explanation will be made of the configuration of FIG. 1.

[Transform Unit 10]

The transform unit 10 performs a predetermined quadrature transform on the input data D_IN sequentially input in units of predetermined blocks to generate transformed data T_K, sets the enable signal DCT_EN in the active state, and notifies the output of the header data of the block, then sequentially outputs these generated transformed data T_K to the write address generation unit 20.

This transform unit 10 is the circuit block corresponding to for example the DCT/quantization unit in the related art JPEG encoding apparatus. In this case, it performs a DCT on the image data D_IN input for every 8×8 pixel data block and quantizes 64 DCT coefficients obtained as a result of this by the quantization step determined for every coefficient. Then, it changes the enable signal T_EN to the active state and notifies the output of the header data of the 8×8 pixel data block, then sequentially outputs 64 quantized DCT coefficients T_K to the write address generation unit 20.

[Write Address Generation Unit 20]

The write address generation unit 20 monitors the state of the enable signal T_EN of the transform unit 10, changes the write enable signal W_EN to the active state synchronous with the detection of this active state, and sets the storage unit 30 in the write enable state.

Further, it sequentially generates write addresses W_ADD corresponding to the input sequence of the transformed data T_K sequentially input from the transform unit 10 and sequentially writes the transformed data T_K with respect to these generated addresses. For example, in the case of the JPEG encoding, it sequentially generates the write addresses W_ADD of the zigzag scan sequence in accordance with the input sequence of the transformed data T_K.

After writing one data block's worth of the transformed data T_K into the storage unit 30, it returns the enable signal W_EN to the non-active state and returns to the state monitoring the enable signal T_EN.

[Storage Unit 30]

When it is set in the write enable state by the enable signal W_EN from the write address generation unit 20, the storage unit 30 stores the transformed data W_DATA sequentially generated at the transform unit 10 in the storage area designated by the write address W_ADD.

Also, when it is set in the read enable state by the enable signal R_EN from the read address generation unit 20, it reads the transformed data R_DATA from the storage area designated by the read address R_ADD and outputs this to the encoding unit 40.

[Read Address Generation Unit 40]

The read address generation unit 40 monitors the state of an enable signal CODE_EN of the encoding unit 50, changes the read enable signal R_EN to the active state synchronous with the detection of this active state, and sets the storage unit 30 in the read enable state.

Further, it sequentially generates read addresses R_ADD, reads the transformed data from the storage unit 30, and sequentially outputs this read transformed data R_DATA to the encoding unit 40. For example, it generates the address sequentially increased or decreased from the start to end of one data block as the read address R_ADD.

After reading one data block's worth of the transformed data R_DATA from the storage unit 30, it returns the enable signal R_EN to the non-active state and returns to the state monitoring the enable signal CODE_EN.

Note that, when an EOB judgment signal S_EOB indicating the end of encoding of the block is input in the middle of a read operation of the transformed data of one block, it returns the enable signal R_EN to the non-active state and terminates the reading of the transformed data.

[EOB Detection Unit 60]

The EOB detection unit 60 detects transformed data not coinciding with specific reference data and the latest in a sequence read from the storage unit 30 to the encoding unit 50 among the block data from among the transformed data written in the storage unit 30 as the block end data. This reference data corresponds to for example a quantized DCT coefficient which becomes zero in the JPEG encoding.

Concretely, it detects the address generated as the read address R_ADD latest at the read address generation unit 40 from among the write addresses W_ADD of the transformed data W_DATA not coinciding with the zero data as the block end address EOB_ADD and outputs this to the EOB judgment unit 70.

Also, when the read address R_ADD generated at the read address generation unit 40 is an address sequentially increasing or decreasing from the start to the end of one data block, it detects the largest or smallest address among the transformed data write addresses W_ADD not coinciding with the zero data as the block end address.

This EOB detection unit 60 will be explained in further detail by referring to FIG. 2 and FIG. 3.

Figure 2:
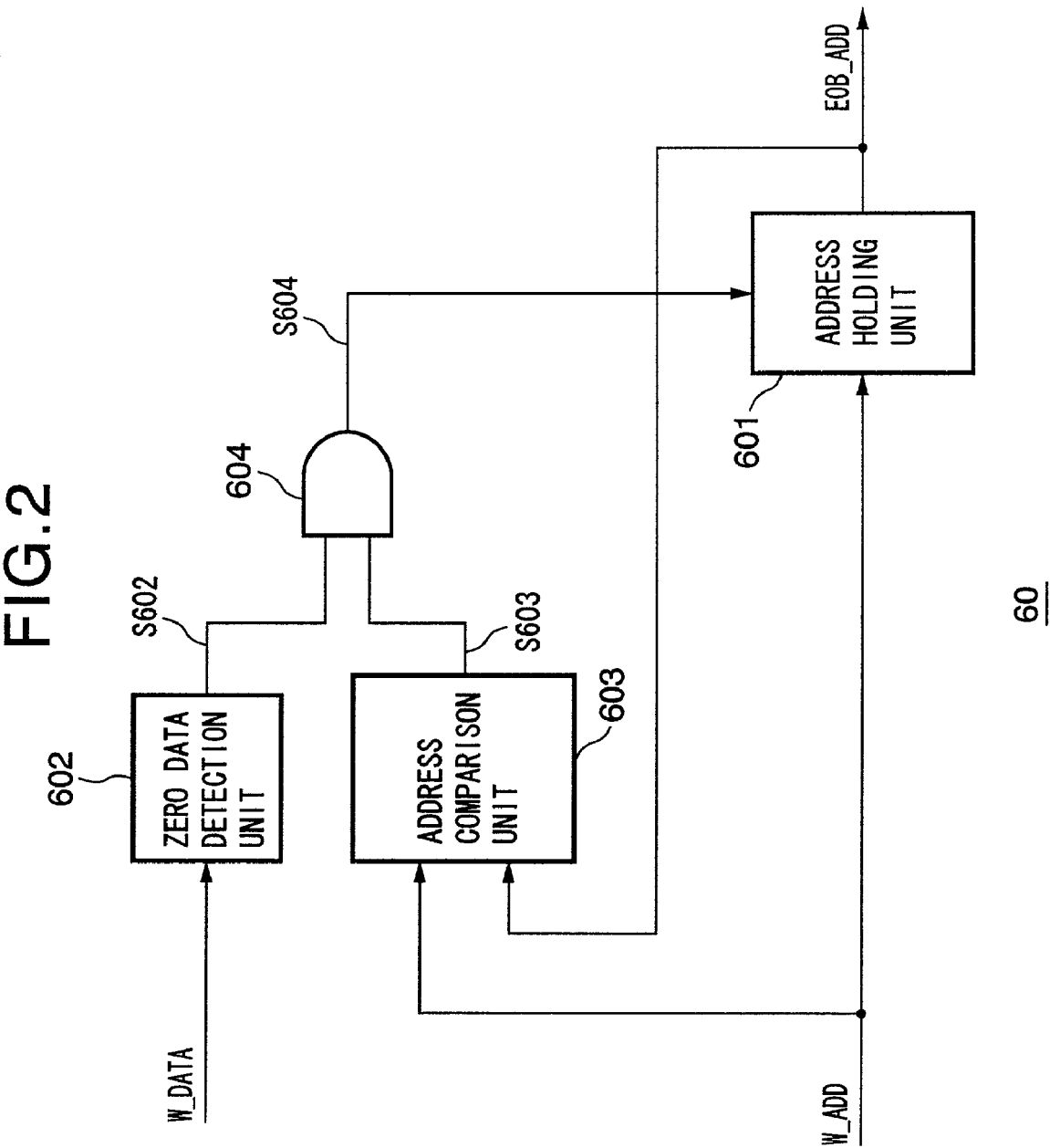
FIG. 2 is a view of the configuration of an EOB detection unit of the data encoding apparatus shown in FIG. 1.

FIG. 2 is a view of the configuration of the EOB detection unit 60 of the data encoding apparatus shown in FIG. 1. The EOB detection unit 60 shown in FIG. 2 has an address holding unit 601, zero data detection unit 602, address comparison unit 603, and AND circuit 604.

Note that, the address holding unit 601 is an embodiment of the address holding means.

The zero data detection unit 602 is an embodiment of the reference data detecting means.

The address comparison unit 603 is an embodiment of the address comparing means.

The AND circuit 604 is an embodiment of the address holding requesting means.

The address holding unit 601 is initialized at a point of time when the first transformed data W_ADD of the block data is input and holds a predetermined initial address. Then, when an enable signal S604 output from the AND circuit 604 has a logic value "1", it holds the input write address W_ADD as the block end EOB_ADD and outputs this to the EOB judgment unit 70.

The zero data detection unit 602 compares the transformed data W_DATA output from the write address generation unit 20 to the storage unit 30 and the zero data and outputs a signal S602 of the logic value "1" to the AND circuit 604 when detecting nonncoincidence of the two.

The address comparison unit 603 compares the relative sizes of the write address W_ADD generated at the write address generation unit 20 and the address held in the address holding unit 601 and outputs a signal S603 in accordance with the results of comparison to the AND circuit 604.

The AND circuit 604 outputs the enable signal S604 of the logic value "1" for holding the write address W_ADD of this transformed data W_DATA in the address holding unit 601 in accordance with the results of comparison at the address comparison unit 603 when noncoincidence of the transformed data W_DATA and the zero data is detected at the zero data detection unit 602.

Figure 3:
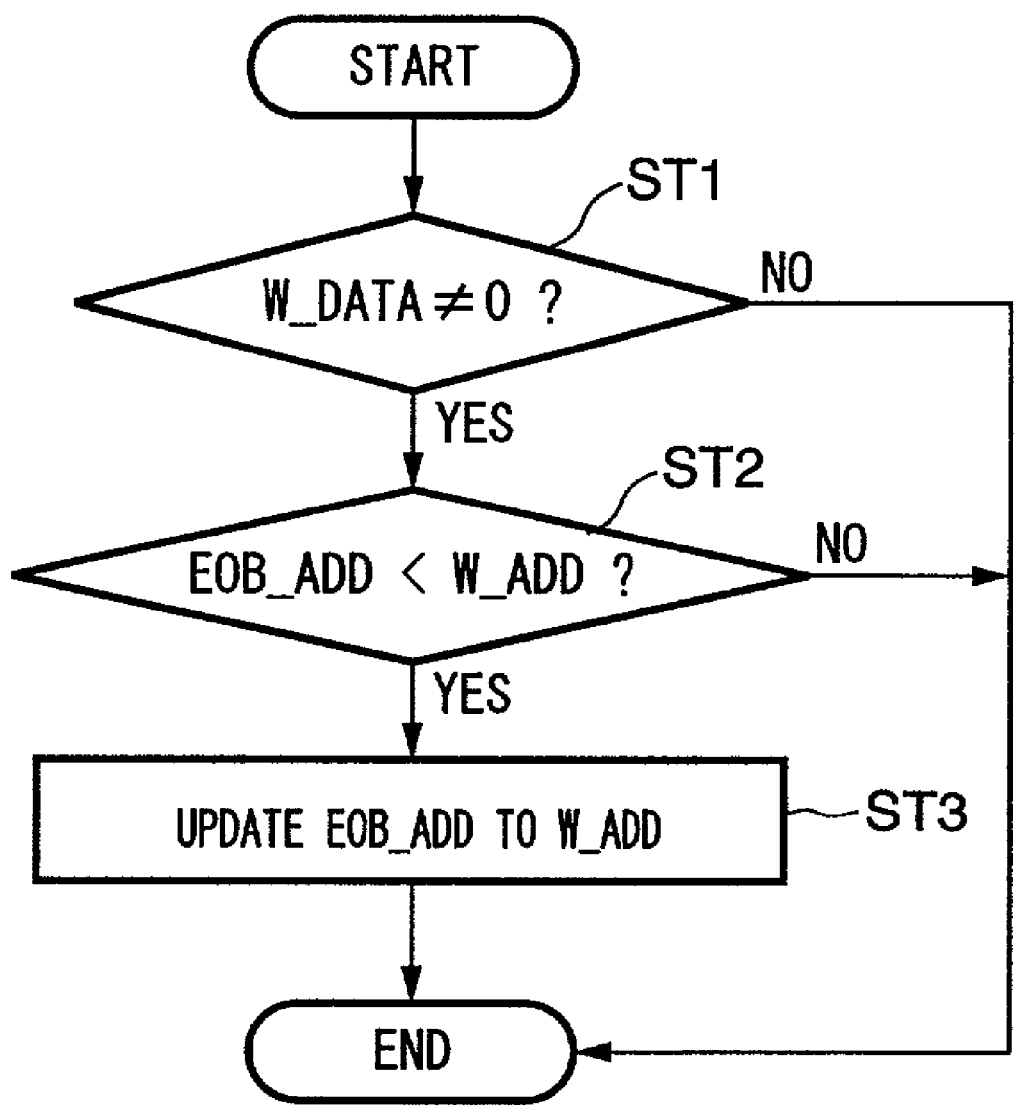
FIG. 3 is a flow chart for explaining an operation of the EOB detection unit shown in FIG. 2.

FIG. 3 is a flow chart for explaining the operation of the EOB detection unit 60 shown in FIG. 2.

When the first write address W_ADD of the block data is input, the predetermined initial address is held in the address holding unit 601. This address held in the address holding unit 601 is sequentially updated according to the flow chart shown in FIG. 3 whenever the write address W_ADD is input. Then, after the last write address W_ADD of the block data is input, the transformed data held in the address holding unit 601 is used for the judgment of the end of the block at the EOB judgment unit 70 as the block end address.

First, at step ST1, it is judged whether or not the transformed data W_DATA is the zero data. When it is not the zero data, the write address W_ADD and the address EOB_ADD held in the address holding unit 601 are compared at step ST2. In the example of FIG. 3, when the address W_ADD is larger than the address EOB_ADD, the address W_ADD is replaced by the address EOB_ADD and held in the address holding unit 601. When the transformed data W_DATA is the zero data or when the address W_ADD is smaller than the address EOB_ADD, the address held in the address holding unit 601 is not updated.

Accordingly, the address holding unit 601 after the last write address W_ADD of the block data is input holds the largest write address W_ADD among the write addresses W_ADD of the transformed data W_DATA which are not the zero data. Then, in this case, the read address R_ADD sequentially increasing from the start to the end of one block is generated at the read address generation unit 40, so the address of the transformed data read from the storage unit 30 latest among the addresses of the transformed data not coinciding with the zero data is detected as the block end address EOB_ADD.

The above explanation was made for the EOB detection unit 60 of FIG. 1.

[EOB Judgment Unit 70]

The EOB judgment unit 70 of FIG. 1 detects whether or not the read address R_ADD and the block end address EOB_ADD coincide. Then, when coincidence of these addresses is detected, it judges that the transformed data R_DATA corresponding to this read address R_ADD is the block end data and outputs the EOB judgment signal S_EOB for indicating the end of encoding of the block to the read address generation unit 40 and the encoding unit 50.

[Encoding Unit 50]

The encoding unit 50 sequentially generates codes in accordance with the transformed data R_DATA sequentially read from the storage unit 30, generates a code corresponding to the transformed data R_DATA when an EOB judgment signal S_EOB indicating the end of encoding of the block is input from the EOB judgment unit 70, generates the code EOB indicating the end of the block after this, and terminates the encoding of the block.

Also, when the encoding unit 50 processes the Huffman encoding of the DCT coefficient in for example the JPEG encoding, it counts the number of the continuous zero data in the data string of the sequentially read transformed data R_DATA and generates a Huffman code in accordance with the count of these continuous zero data and the value of the data which is not the zero data output after the continuous zero data. Further, when this count of zero data reaches the value "16", it immediately generates the code ZRL.

This encoding unit 50 will be explained in further detail with referring to FIG. 4 and FIGS. 5A to 5F.

FIG. 4 is a view of the configuration of the encoding unit 50 of the data encoding apparatus shown in FIG. 1. The encoding unit 50 shown in FIG. 4 has a zero data counter 501, code table address generation unit 502, code table unit 503, and control unit 504.

The zero data counter 501 is a counter for counting the number of continuous zero data in the data string of the transformed data R_DATA read from the storage unit 30. This count is initialized to zero at the point of time when the encoding of one block is started. The count is incremented by each one whenever zero data is input to the transformed data R_DATA. Then, when non-zero data is input to the transformed data R_DATA, this non-zero data DATA and the count Z_CT are output to the code table address generation unit 502. Thereafter, the count is initialized to zero and the count of the zero data is carried out again. Also, even in the case where the count reaches the value "16", the count is initialized to zero and the counting of the zero data is carried out again.

The code table address generation unit 502 generates the address TBL_ADD of the code table 503 in accordance with the combination of the non-zero data DATA output from the zero data counter 502 and the count Z_CT and outputs this to the code table unit 503.

Note that when the count Z_CT reaches the value "16", it generates the address TBL_ADD in accordance with the code ZRL.

Also, when the signal S_EOB indicating the end of encoding of the data block is input, it generates the address TBL_ADD of the Huffman code table 503 corresponding to the code EOB.

The code table unit 503 extracts and outputs the code corresponding to the table address TBL_ADD from the predetermined data table. For example, when the encoding unit 50 performs Huffman encoding of the DCT coefficients in JPEG encoding, the Huffman code corresponding to the table address TBL_ADD is extracted from the predetermined data table and output.

The control unit 504 sets the enable signal CODE_EN in the active state upon receipt of the activation signal STA and starts the reading of the transformed data from the storage unit 30.

Also, when the reading of one data block's worth of the transformed data is terminated, when the signal S_EOB indicating the end of encoding of the data block is input, it returns the enable signal CODE_EN to the non-active state and terminates the Huffman encoding.

FIGS. 5A to 5F are timing charts for explaining the operation of the encoding unit 50 shown in FIG. 4. Note that, in FIGS. 5A to 5F, the example of timing of the case where the JPEG encoding is carried out at the encoding unit 50 is shown.

Time T11: The enable signal R_EN (FIG. 5B) changes to the active state synchronous with the clock signal (FIG. 5a), whereupon the transformed data R_DATA (FIG. 5c) is input to the encoding unit 50.

This first input transformed data R_DATA is the DC component in for example JPEG encoding. The processing is different from that for an AC component to be subsequently input. For a DC component, the address TBL_ADD of the Huffman code table for the DC component is generated based on the differential value relative to the DC component of the previously input 8×8 pixel data block. A Huffman code CODE in accordance with this is output from the Huffman code table 503.

Time T12: The non-zero data (value "2") is input as the transformed data R_DATA. The address TBL_ADD (FIG. 5F) in accordance with the combination of this value "2" and the value "1" of the count Z_CT (FIG. 5D) of the zero coefficients continuously input before the value "2" is generated at the code table address generation unit 502. A Huffman code CODE in accordance with this is output from the code table unit 503.

Time T13: Non-zero (value "1") data is input as the transformed data R_DATA. The address TBL_ADD in accordance with the combination of this value "1" and the value "0" of the count Z_CT of the zero data continuously input before the value "1" is generated. A Huffman code CODE in accordance with this is output from the code table unit 503.

Time T14: The count Z_CT of the continuously input zero data reaches the value "16". The code ZRL is generated in accordance with this.

In the related art JPEG encoding apparatus, it could not be decided which code of the code ZRL or the code EOB was to be generated at this stage, but in the present invention, the timing for generating the code EOB can be decided based on the signal S_EOB output from the EOB judgment unit 70. Therefore, when the end of the encoding is not indicated by the signal S_EOB (FIG. 5E) and the count Z_CT of the zero data reaches the value "16", the generation of the code ZRL can be immediately decided. By this, the code ZRL can be generated without suspending the reading of the transformed data R_DATA.

Time T15: The non-zero (value "1") data is input as the transformed data R_DATA. The address TBL_ADD in accordance with the combination of this value "1" and the value "0" of the count Z_CT of the zero data continuously input before the value "1" is generated, and a Huffman code CODE in accordance with this is output from the code table unit 503.

Also, at this time, the signal S_EOB indicating the end of encoding of the block is input, so the address TBL_ADD corresponding to the code EOB is generated. Then, at a time T16 of the next clock cycle, the code EOB is output from the code table unit 503.

Further, the enable signal CODE_EN is returned to the non-active state, so the enable signal R_EN of the read address generation unit 40 is returned to the non-active state in accordance with this and the reading of the transformed data from the storage unit 30 is terminated.

In this way, when the code EOB is generated before the block last data, the encoding can be terminated without reading the block data up to the last data, so the encoding can be speeded up.

The above explanation was made for the encoding unit 50 of FIG. 1.

Next, an explanation will be made of the operation of the data encoding apparatus shown in FIG. 1 having the above configuration by referring to FIGS. 6A and 6B to FIG. 8.

Figures 6A, 6B:
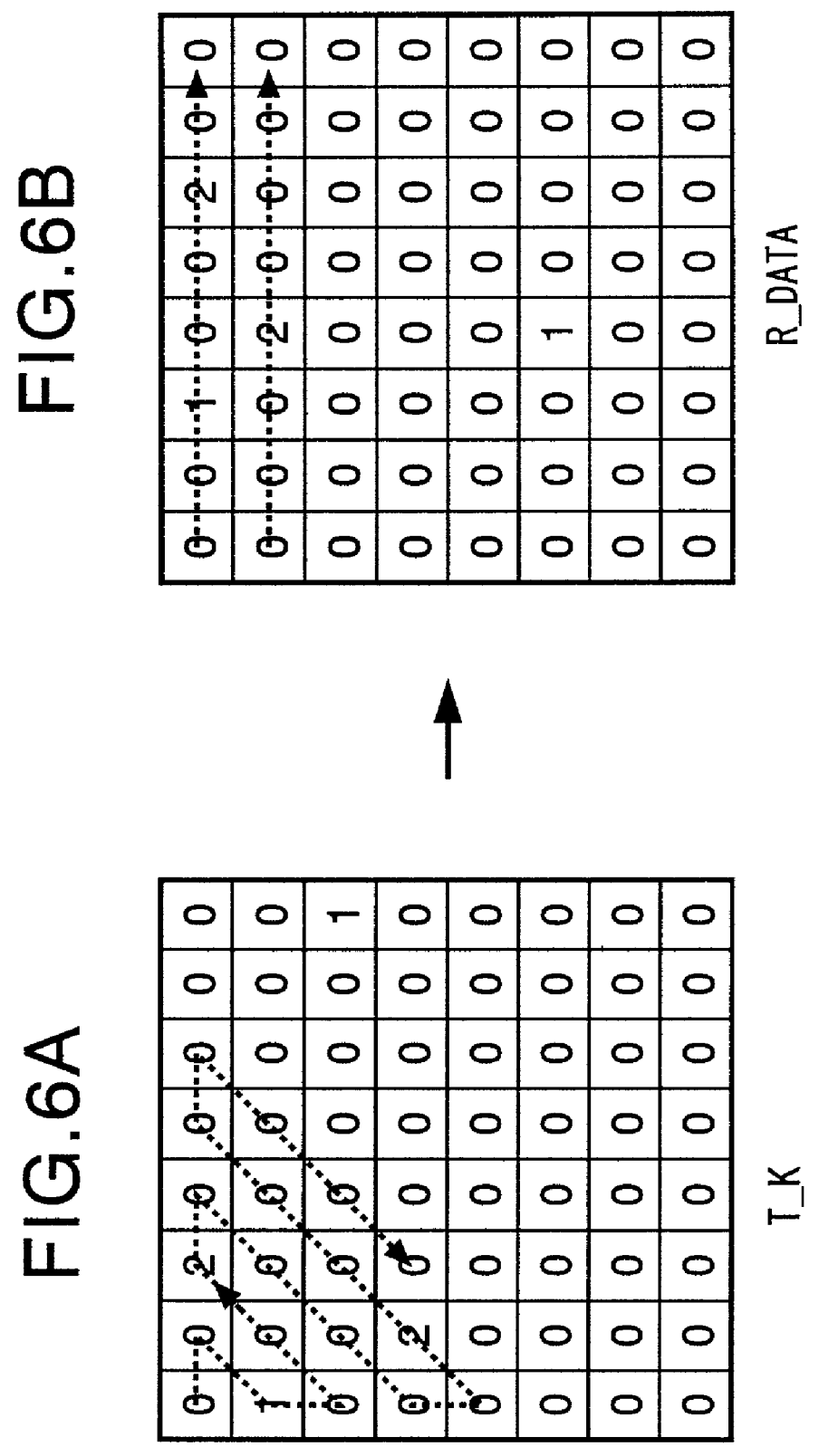

FIGS. 6A and 6B are views of an example of the transformed data of a 8×8 pixel data block generated at the transform unit 10 and the data obtained by rearranging this transformed data to the zigzag manner.

FIGS. 7A to 7F are timing charts for explaining the write operation of the transformed data into the storage unit 30 in the case where the transformed data T_K shown in the example of FIG. 6A is input to the data encoding apparatus.

Time T17: The transformed data W_DATA obtained by the latching of the transformed data T_K (FIG. 7B) by the write address generation unit 20 and the write address W_ADD corresponding to this are input to the storage unit 30 synchronous with the clock signal (FIG. 7A). Since the write enable signal W_EN (FIG. 7C) is set in the active state, this transformed data W_DATA (value "2") is stored at the write address W_ADD (value "05") of the storage unit 30. Also, the transformed data W_DATA is non-zero data and then the write address W_ADD is larger than an initial address value "00" held in the address holding unit 601 of the EOB detection unit 60, so this write address (value "05") is held in the address holding unit 601. Accordingly, the block end address EOB_ADD output from the EOB detection unit 60 becomes the value "05" in the next clock cycle.

Time T18: The transformed data W_DATA is the nonzero data (value "1") and the write address W_ADD (value "43") is larger than the address value "05" held in the address holding unit 601 of the EOB detection unit 60, so this write address (value "43") is held in the address holding unit 601. Accordingly, the block end address EOB_ADD output from the EOB detection unit 60 becomes the value "43" in the next clock cycle.

Time T19: The transformed data W_DATA is the nonzero data (value "2"), but the write address W_ADD (value "11") is smaller than the address value "43" held in the address holding unit 601 of the EOB detection unit 60, so this write address (value "11") is not held in the address holding unit 601. Accordingly, the block end address EOB_ADD output from the EOB detection unit 60 is held as the value "43" as it is.

FIGS. 8A to 8G are timing charts for explaining the read operation of the transformed data from the storage unit 30 in the case where the transformed data R_DATA shown in the example of FIG. 6B is input to the data encoding apparatus.

At a time T20, the address value equal to the address value "43" held in the EOB detection unit 60 as the block end address EOB_ADD is input to the storage unit 30 as the read address R_ADD. Due to this, the signal S_EOB indicating the encoding end of data block is output from the EOB judgment unit 70 to the read address generation unit 40, and the read enable signal R_EN is returned to the non-active state in the next clock cycle (time T21). Also, the value of the read address R_ADD is reset to the initial value "00". Further, the code EOB is generated at the encoding unit 50, and the encoding of the block data is terminated.

As explained above, according to the data encoding apparatus shown in FIG. 1, the circuit block including the write address generation unit 20, storage unit 30, and read address generation unit functions as a block (data string rearrangement unit) for rearranging the sequence of the transformed data in block units (8×8 pixel data block in the JPEG encoding) sequentially input from the transform unit 10 to the predetermined output sequence corresponding to the input sequence and outputting this to the encoding unit 50.

The EOB detection unit 60 detects and holds the transformed data not coinciding with the predetermined zero data and the latest in the output sequence to the encoding unit 50 from among the transformed data input to this data string rearrangement unit as the block end data and outputs the address EOB_ADD thereof to the EOB judgment unit 70.

The EOB judgment unit 70 judges whether or not the transformed data rearranged and output at the data string rearrangement unit is the block end data.

The encoding unit 50 sequentially generates codes in accordance with the transformed data output from the data string rearrangement unit. Then, when the EOB judgment unit 70 judges that the transformed data of this output is the block end data, it generates a code in accordance with this transformed data, generates the code EOB, and terminates the encoding of the data block containing this transformed data.

Also, according to the encoding method of data in the data encoding apparatus shown in FIG. 1, first the write address generation unit 20 generates the predetermined write addresses W_ADD in accordance with the input sequence of the transformed data T_K sequentially input from the transform unit 10 corresponding to the transformed data. The input transformed data W_DATA is stored at corresponding write addresses W_ADD of the storage unit 30. Also, among the write addresses of the transformed data of the non-zero data, the address read latest in the sequence of reading from the storage unit 30 is detected at the EOB detection unit 60 as the block end address.

Then, when the read address generation unit 40 sequentially generates the read addresses R_ADD, the transformed data R_DATA is read from the read addresses of the storage unit 30 and output to the encoding unit 50. When the read address R_ADD and the block end address detected at the EOB detection unit 60 do not coincide, the codes in accordance with the transformed data R_DATA are sequentially generated at the encoding unit 50, while when the read address R_ADD and the block end address coincide, the code corresponding to the transformed data of this address is generated, then the code EOB is generated and the encoding of the data block is terminated.

Accordingly, in the case where the code EOB indicating the end of the data block is generated, an end position of encoding is detected in advance before the encoding. Therefore, where there is an end position of the encoding before the last data of the data block, after the data is encoded up to this encoding end position, the code EOB is generated, and the encoding can be immediately terminated. Due to this, in comparison with the case of the related art method wherein the code EOB cannot be generated unless the data is read up to the last data of the data block, the speed of the encoding can be raised.

Also, in the case of for example the JPEG encoding of the AC components of the DCT coefficients, the encoding unit 50 counts the number of the zero data continuously output from the data string rearrangement unit, generates a Huffman code in accordance with the count of the continuous zero data and the value of the data which is not the zero data output after the continuous zero data, and, when this count reaches the value "16", generates the code ZRL, then subtracts the value "16" from the count. Accordingly, it is not necessary to wait until a non-zero DCT coefficient is detected before generating the code ZRL as in the related art JPEG encoding. The code ZRL can be immediately generated at the point of time when the count reaches the value "16". Further it is not necessary to suspend the input of the data when the code ZRL is generated as in the related art method, so the speed of the encoding can be further raised. Also, the processing block for suspending the input of the data becomes unnecessary, so the circuit can be made smaller in scale.

<Second Embodiment>

Next, an explanation will be made of a second embodiment according to the present invention by referring to FIG. 9.

In the present embodiment, the present invention will be explained by illustrating a camera system for picking up a still image, compressing and encoding the same, and recording it, for example, an electronic still camera.

Figure 9:
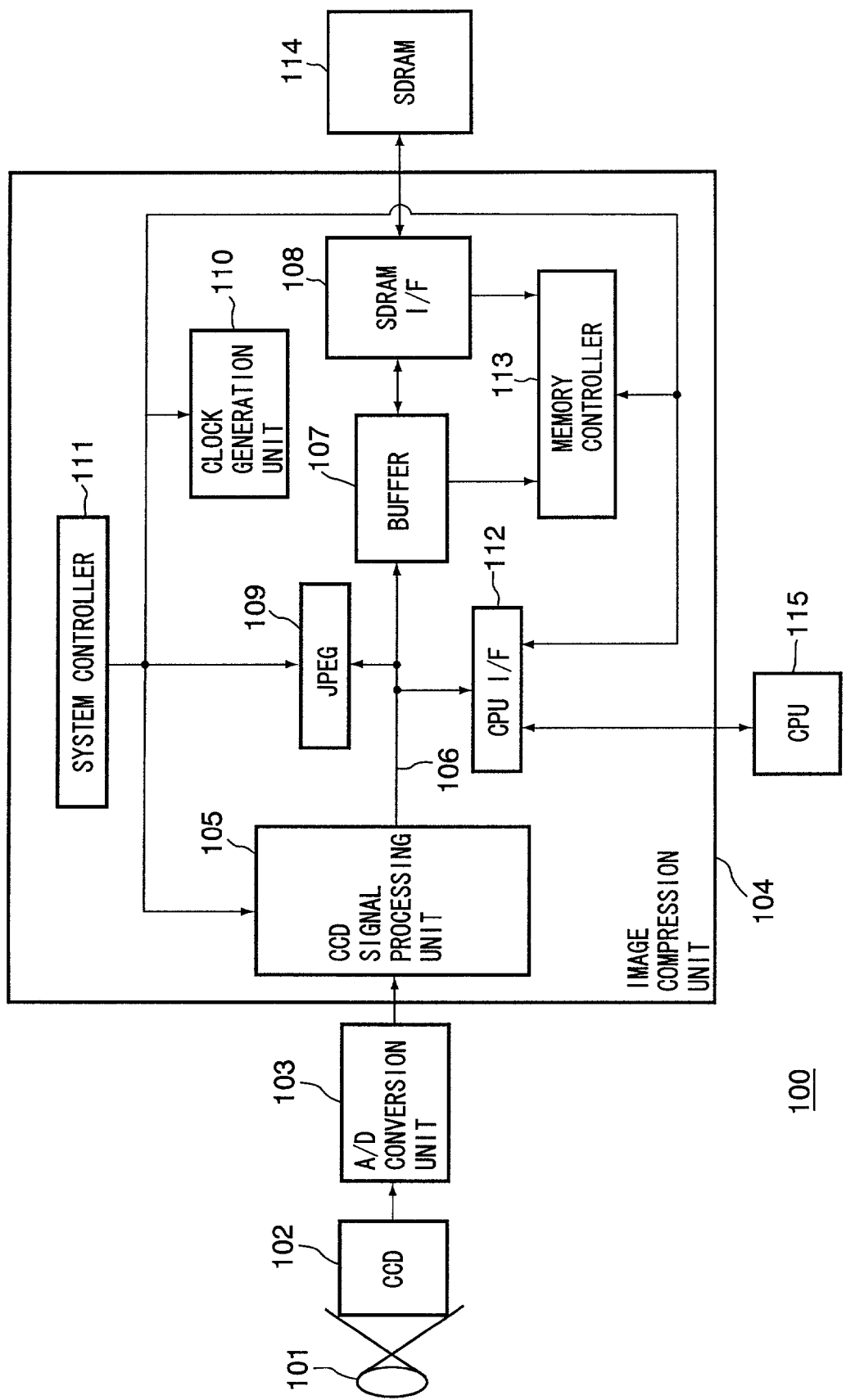
FIG. 9 is a view of the configuration of a camera system of a second embodiment according to the present invention.
Figure 10:
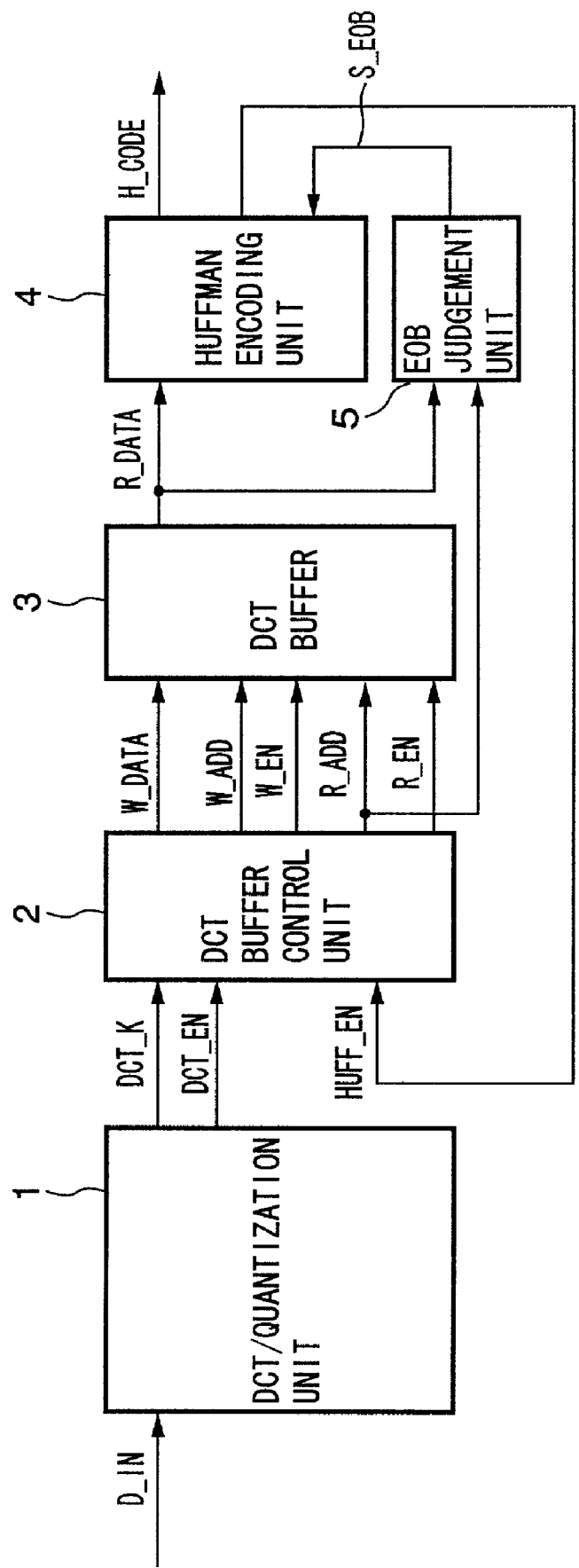
FIG. 10 is a view of the configuration of the related art JPEG encoding apparatus.
Figure 11:
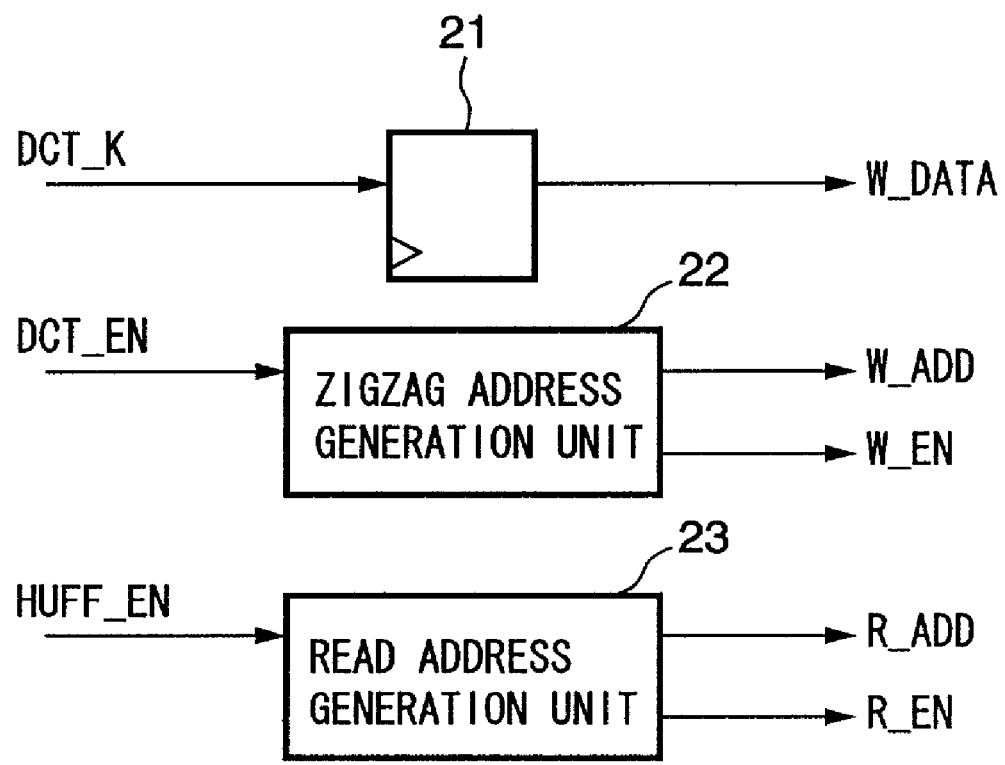
FIG. 11 is a view of the configuration of a DCT buffer control unit of the JPEG encoding apparatus shown in FIG. 10.
Figures 12A, 12B:
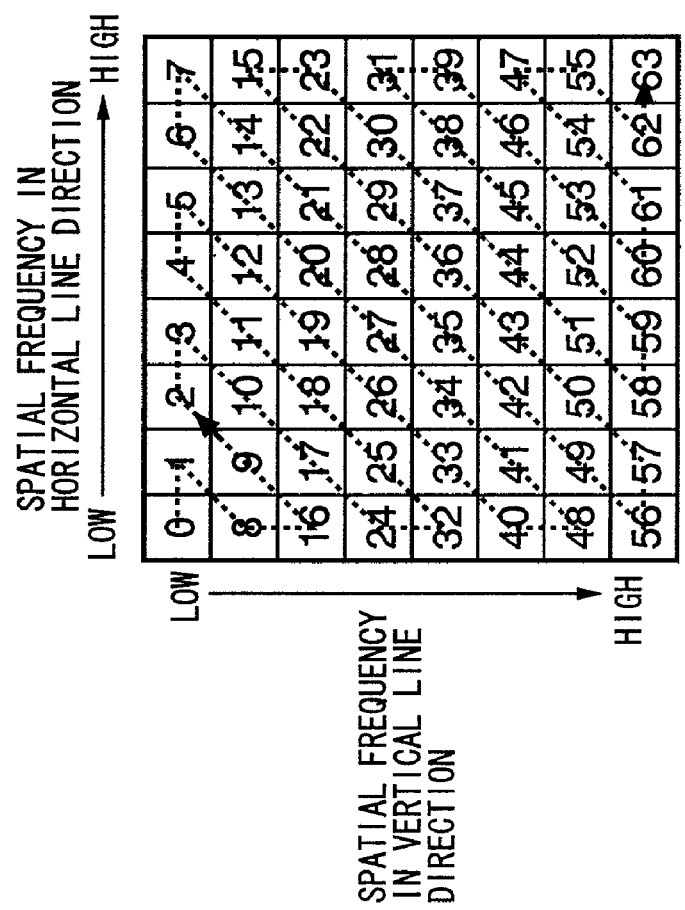
FIGS. 12A and 12B are views showing a sequence of generating DCT coefficients generated at a DCT/quantization unit and a sequence of reading DCT coefficients written in the DCT buffer according to the sequence of the zigzag scan.
Figure 13:
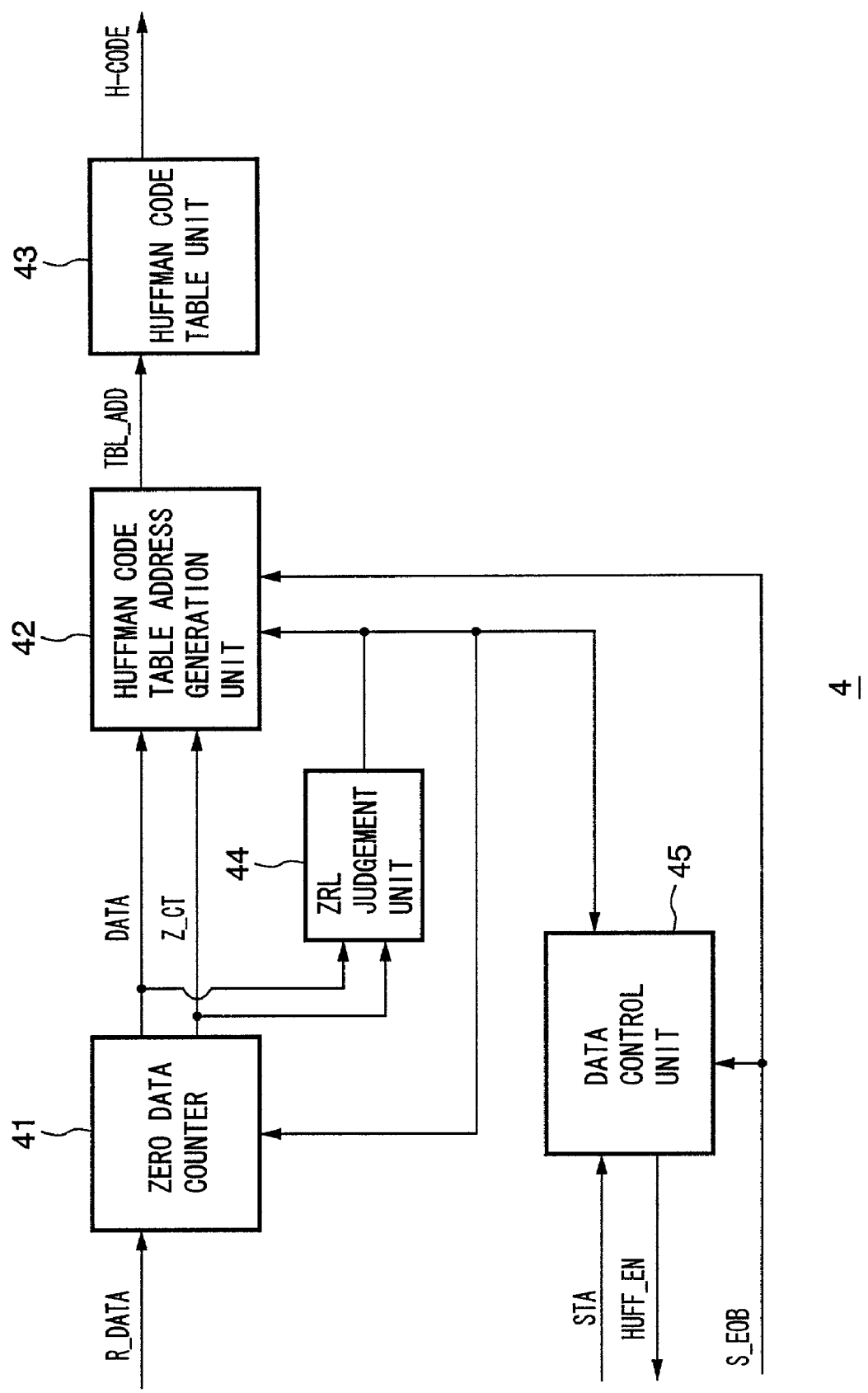
FIG. 13 is a view of the configuration for explaining a Huffman encoding unit of the JPEG encoding apparatus shown in FIG. 10.
Figure 14:
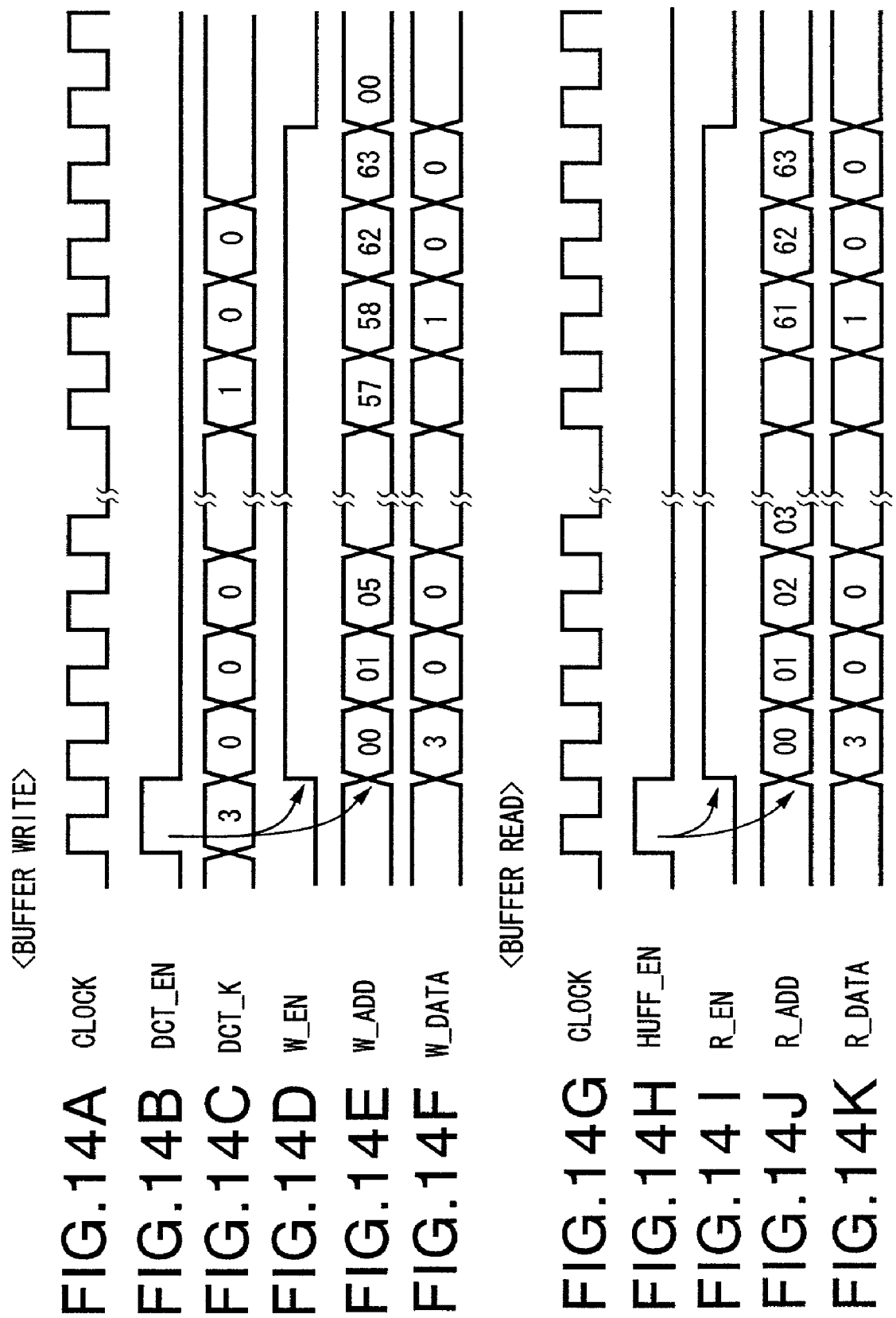
FIGS. 14A to 14K are timing charts for explaining a rearrangement operation of DCT coefficients to the zigzag scan sequence in the JPEG encoding apparatus shown in FIG. 10.

FIG. 9 is a view of the configuration of a camera system 100 of the second embodiment according to the present invention. The camera system 100 has an optical system 101, charge coupled device (CCD) 102, analog to digital (A/D) conversion unit 103, image compression unit 104, static dynamic RAM (SDRAM) 114, and central processing unit (CPU) 115.

Also, the image compression unit 104 has a CCD signal processing unit 105, bus 106, buffer 107, SDRAM interface (SDRAM I/F) 108, JPEG processing unit 109, clock generation unit 110, system controller 111, CPU interface (CPU I/F) 112, and memory controller 113.

The optical system 101 picks up the desired image by the operation of the user and focuses optical signals thereof on a pickup surface of the CCD 102.

The CCD 102 converts the optical signal on the pickup surface focused by the optical system 101 to an electric signal and outputs this as an analog image signal to the A/D conversion unit 103.

The A/D conversion unit 103 converts the analog image signal input from the CCD 102 to a digital signal of a predetermined tone and outputs this to the CCD signal processing unit 105 of the image compression unit 104.

The CCD signal processing unit 105 of the image compression unit 104 demultiplexes the input digital image signal to color signals of R (red), G (green), and B (blue) under the control of the system controller 111, performs gamma correction for color reproducibility on the color signals, and further generates a luminance signal and a color difference signal. The image signal comprised of the generated luminance signal and color difference signal is output via the bus 106 to the buffer 107.

The buffer 107 sequentially stores the image signals input from the CCD signal processing unit 105 via the bus 106. When it accumulates a constant amount of data, it outputs this to the SDRAM I/F 108 under the control of the memory controller 113. Also, it temporarily stores the image data input from the SDRAM I/F 108 and read from the SDRAM 114 and outputs it via the bus 106 to the JPEG processing unit 109.

The SDRAM I/F 108 is an external memory of the image compression unit 104 and stores the image data for every predetermined unit input from the buffer 107 in the SDRAM 114 under the control of the memory controller 113. Also, it reads out the image data stored in the SDRAM 114 in units of data blocks each consisting of 8×8 pixel data and outputs this to the buffer 107.

The JPEG processing unit 109 JPEG encodes the image signal read from the SDRAM 114 and input via the buffer 107 under the control of the system controller 111, generates an encoded bit stream, and outputs this via the bus 106 and the CPU I/F 112 to the CPU 115.

Note that, this JPEG processing unit 109 has a similar configuration to the data encoding apparatus shown in FIG. 1 mentioned above and executes the encoding by an operation similar to that mentioned above.

The clock generation unit 110 generates clocks to be used at parts of the image compression unit 104 under the control of the system controller 111 and provides them to the components.

The bus 106 diagrammatically shows the data bus in the image compression unit 104. This bus 106 is used for transfer of the image data from the CCD signal processing unit 105 to the buffer 107 and from the buffer 107 to the JPEG processing unit 109, the transfer of the encoded bit stream from the JPEG processing unit 109 to the CPU I/F 112, etc.

The system controller 111 operates under the control of the CPU 115 and controls the components of the image compression unit 104 so that the operation of the image compression unit 104, that is, the storage of the input image data into the SDRAM 114, the transfer of the image data stored in the SDRAM 114 to the JPEG processing unit 109, the JPEG encoding in the JPEG processing unit 109, the output of the encoded image data to the CPU 115, etc. are suitably executed.

The CPU I/F 112 is the interface with the CPU 115 and receives as input the control signal and the image signal from the CPU 115, outputs the control signal and the encoded data to the CPU 115, and so on.

The memory controller 113 controls the buffer 107 and the SDRAM I/F 108 under the control of the system controller 111 and controls the storage of the image data into the SDRAM 114, the reading of the image data stored in the SDRAM 114, and so on.

The SDRAM 114 is a memory for temporarily storing the picked up image data comprised of the luminance signal and color difference signal. The image data picked up at the optical system 101 to A/D conversion unit 103 is once stored in the SDRAM 114, then sequentially supplied to the JPEG processing unit 109, encoded, output to the CPU 115, and used for the storage, display, transmission, etc.

The CPU 115 controls the components of the camera system 100 so that the processing by the optical system 101 to the image compression unit 104 and SDRAM 114 such as the picking up of the intended image, image processing, storage and reproduction of the image data, JPEG encoding, and the storage, display, and transmission of the JPEG encoding data are suitably carried out and so that the camera system 100 performs the intended operation as a whole.

In the camera system 100 having such a configuration, first, when the optical system 101 picks up the desired image by the operation of the user, the CCD 102 converts the optical signal to an electric signal and generates the image signal. The A/D conversion unit 103 converts the image signal from an analog signal to a digital signal, then the CCD signal processing unit 105 of the image compression unit 104 breaks this down to color signals, performs gamma correction, and converts the result to an image signal comprised of a luminance signal and color difference signal.

This image signal is stored once in the SDRAM 114 via the buffer 107 and the SDRAM I/F 108, then sequentially read for every data block of 8×8 pixel data and input to the JPEG processing unit 109.

The JPEG processing unit 109 encodes the image data for every sequentially input data block, generates the JPEG encoded data stream of a predetermined format, output it via the CPU I/F 112 to the CPU 115, and performs processing such as the storage, display, and transmission.

In the second embodiment, by applying the data encoding apparatus shown in FIG. 1 to the JPEG processing unit 109, the generated image data can be JPEG encoded at a higher speed than the related art method and the circuit can be made smaller in scale.

Note that, the present invention is not limited to these embodiments. Various modifications are possible.

For example, the configurations etc. of the data encoding apparatuses shown in FIG. 1, FIG. 2, and FIG. 4 and the camera system shown in FIG. 9 are not limited to the above. Any configurations can be employed.

Also, the present invention can be applied to any encoding system other than JPEG encoding (for example MPEG) and not limited to JPEG encoding.

Summarizing the effects of the present invention, according to the present invention, in a data encoding apparatus and data encoding method wherein a predetermined code indicating the end of encoding of a data block is generated, the speed of the encoding can be raised in comparison with the related art method and the circuit can be made smaller in scale.

Also, in a camera system compressing and encoding generated image data as well, the speed of the encoding can be raised in comparison with the related art method and the circuit can be made smaller in scale.

While the invention has been described with reference to specific embodiments chosen for purpose of illustration, it should be apparent that numerous modifications could be made thereto by those skilled in the art without departing from the basic concept and scope of the invention.

What is claimed is:

1. A data encoding apparatus for encoding data for every data block of a predetermined number of pixels of data, said data encoding apparatus comprising:
    a data string rearranging means for outputting data of sequentially input data blocks in a predetermined output sequence corresponding to an input sequence;
    a block end data detecting means for detecting input data not coinciding with reference data and latest in said output sequence from among the input data of said data string rearranging means as block end data;
    a block end judging means for judging whether or not the output data of said data string rearranging means is said block end data; and
    an encoding means for sequentially generating codes in accordance with the output data of said data string rearranging means, generating a first code in accordance with the output data when said block end judging means judge that the output data is said block end data, and terminating the encoding of the data block containing the output data.

2. The data encoding apparatus as set forth in claim 1, wherein said encoding means counts a number of said reference data continuously output from said data string rearranging means, generates a code in accordance with the count of continuous reference data and a value of the data which is not the reference data output after the continuous reference data, and generates a second code and subtracts said value from the count when said count reaches a predetermined value.

3. The data encoding apparatus as set forth in claim 1, wherein said data string rearranging means further comprises:
   a storing means for storing said input data at a designated address upon receipt of a data write request and reading the data stored at the designated address upon receipt of a data read request,
   a writing means for outputting said data write request to said storing means, generating predetermined write addresses in accordance with the input sequence of said input data corresponding to the input data, and storing said input data at corresponding write addresses of said storing means, and
   a reading means for outputting said data read request to said storing means, sequentially generating predetermined read addresses, and sequentially reading the data stored at the read addresses of said storing means, and
   wherein said block end data detecting means detects the address read latest in said reading means among said write addresses of said input data not coinciding with said reference data as the block end address, and
   wherein said block end judging means judges that the output data corresponding to the read address is said block end data when said read address and said block end address coincide.

4. The data encoding apparatus as set forth in claim 3, wherein
   said reading means generates successively increasing or decreasing addresses, and
   said block end judging means detects a largest or a smallest address among transformed data write addresses W_ADD not coinciding with the reference data as the block end address.

5. The data encoding apparatus as set forth in claim 4, wherein said block end judging means further comprises:
   an address holding means for holding an initial address at an input starting time of the block data, receiving an address holding request, and holding said write address as said block end address;
   a reference data detecting means for detecting noncoincidence of input data of said data string rearranging means and said reference data;
   an address comparing means for comparing relative sizes of the write address generated at said writing means and the address held in said address holding means; and
   an address holding requesting means for requesting holding of a write address corresponding to said input data to said address holding means in accordance with results of comparison at said address comparing means when noncoincidence of said input data and said reference data is detected at said reference data detecting means.

6. A data encoding method for encoding data for every data block of a predetermined number of pixels of data, said method comprising the steps of:
   a block end data detecting step for detecting data not coinciding with reference data and latest in a predetermined output sequence corresponding to an input sequence of input data from among data of sequentially input data blocks as the block end data; and
   an encoding step for outputting said input data in said output sequence, sequentially generating codes in accordance with the output data when said output data is not said block end data, generating a first code in accordance with the output data when said output data is said block end data, and terminating the encoding of the data block containing the output data.

7. The data encoding method as set forth in claim 6, wherein in said encoding step, the processing is carried out to count a number of continuously output reference data, generate a code in accordance with said count of the continuous reference data and a value of the data which is not reference data output after the continuous reference data, and generate a second code and subtracts said value from the count when said count reaches a predetermined value.

8. The data encoding method as set forth in claim 6, wherein said block end data detecting step further comprises the steps of:
   generating predetermined write addresses in accordance with the input sequence of said input data corresponding to the input data,
   detecting the address read latest in said output sequence among said write addresses of said input data not coinciding with said reference data as the block end address, and
   storing said input data at corresponding write addresses of a storing means, and
   wherein said encoding step further comprises the steps of:
   sequentially generating predetermined read addresses,
   sequentially reading the data stored at the read addresses of said storing means, and
   sequentially generating codes in accordance with the output data when said read address and said block end address do to coincide, while generating the first code in accordance with the output data when they coincide, and terminating the encoding of the data block containing the output data.

9. The data encoding method as set forth in claim 6, wherein
   in the detecting step, said block end address, a largest or a smallest address among the write addresses of the input data not coinciding with the reference data as the block end address is detected and
   in the generating step, said read address, successively increasing or decreasing addresses is generated.

10. The data encoding method as set forth in claim 9, wherein the step of detecting said block end addresses repeats the following steps of:
   detecting said block end address,
   holding an initial address at an input starting time of the block data;
   detecting noncoincidence of said input data and said reference data;
   comparing relative sizes of the generated write address and the held address; and
   holding a write address corresponding to said input data replacing said held address in accordance with results of comparison at the step of comparing the relative sizes when noncoincidence of said input data and said reference data is detected at said step of detecting noncoincidence.

11. A camera system for compressing and encoding generated image data for every data block of a predetermined number of pixels of data, said camera system comprising:
   an image pickup means for picking up a desired image and generating image data;
   a transforming means for transforming said generated image data based on a predetermined quadrature transform for every data block;
   a data string rearranging means for sequentially receiving as input orthogonally transformed image data for every data block and outputting input image data in a predetermined output sequence corresponding to a sequence of input of the input image data;

a block end data detecting means for detecting input image data not coinciding with predetermined reference data and latest in said output sequence from among the input image data of said data string rearranging means as block end data;

a block end judging means for judging whether or not the output image data of said data string rearranging means is said block end data;

an encoding means for sequentially generating codes in accordance with the output image data of said data string rearranging means, generating a first code in accordance with the output image data when said block end judging means judges that the output image data is said block end data, and terminating the encoding of the data block containing the output image data; and a processing means for performing predetermined processing with respect to the image data encoded at said encoding means.

12. The camera system as set forth in claim 11, wherein said processing means performs at least one processing of recording, reproduction and display, or transmission with respect to said encoded image data.

13. The camera system as set forth in claim 11, wherein said encoding means counts a number of reference data continuously output from said data string rearranging means, generates a code in accordance with the count of continuous reference data and a value of the data which is not the reference data output after the continuous reference data, and generates a second code and subtracts said value from the count when said count reaches a predetermined value.

14. The camera system as set forth in claim 13, wherein said data string rearranging means further comprises:

a storing means for storing said input image data at a designated address upon receipt of a data write request and reading the image data stored at the designated address upon receipt of a data read request, a writing means for outputting said data write request to said storing means, generating predetermined write addresses in accordance with the input sequence of said input image data corresponding to the input image data, and storing said input image data at corresponding write addresses of said storing means, and a reading means for outputting said data read request to said storing means, sequentially generating predetermined read addresses, and sequentially reading the image data stored at the read addresses of said storing means, and wherein said block end data detecting means detects the address read latest in said reading means among said write addresses of said input image data not coinciding with said reference data as the block end address, and wherein said block end judging means judges that the output data corresponding to the read address is said block end data when said read address and said block end address coincide.

* * * * *